US012750445B2

(12) United States Patent
Ambhaikar et al.

(10) Patent No.: US 12,750,445 B2
(45) Date of Patent: Sep. 29, 2026

(54) SYSTEM AND METHOD FOR DETECTION AND IMPLEMENTATION OF LITIGATION-HOLD AND RELEASE FOR INTERACTIONS RECORDINGS WITHIN A CONTACT CENTER

(71) Applicant: NICE LTD., Ra'anana (IL)

(72) Inventors: Darshan Ambhaikar, Pune (IN); Seemit Shah, Pune (IN); Salil Dhawan, Pune (IN); Shunit Metz, Herzliya (IL)

(73) Assignee: NICE LTD, Ra'anana (IL)

( * ) Notice: Subject to any disclaimer, the term of this patent is extended or adjusted under 35 U.S.C. 154(b) by 100 days.

(21) Appl. No.: 19/007,600

(22) Filed: Jan. 2, 2025

(65) Prior Publication Data

US 2026/0189653 A1 Jul. 2, 2026

(51) Int. Cl.
*H04M 3/42* (2006.01)
*H04M 3/51* (2006.01)

(52) U.S. Cl.
CPC ..... *H04M 3/42221* (2013.01); *H04M 3/5183* (2013.01)

(58) Field of Classification Search
CPC ........................ H04M 3/5183; H04M 3/42221
USPC ............................................ 379/265.01, 67.1
See application file for complete search history.

(56) References Cited

U.S. PATENT DOCUMENTS

| | | | | |
|---|---|---|---|---|
| 2005/0015286 A1* | 1/2005 | Rudnik | H04N 5/765 | 386/E5.002 |
| 2009/0028310 A1* | 1/2009 | Anderson | H04M 3/42221 | 379/136 |
| 2013/0064356 A1* | 3/2013 | Waalkes | H04M 3/42221 | 379/88.01 |
| 2017/0134572 A1* | 5/2017 | Waalkes | H04M 3/42221 | |
| 2025/0117808 A1* | 4/2025 | Hogan | G06N 20/00 | |

* cited by examiner

*Primary Examiner* — Ahmad F. Matar
(74) *Attorney, Agent, or Firm* — SOROKER NORDMAN RIBA

(57) ABSTRACT

A computerized-method for detection and implementation of litigation-hold and release for interactions recordings within a contact center. The computerized-method includes for each recording file of an interaction between a customer and an agent in the contact center: (i) retrieving interaction metadata and interaction analysis; (ii) calculating a Litigation Likelihood Score (LLS) for a recording file of the interaction based on the retrieved interaction metadata and interaction analysis; (iii) setting the recording file on litigation-hold status when the LLS is above a preconfigured threshold for a preconfigured period of time; (iv) checking if there was access to the recording file after the preconfigured period of time has elapsed; and (v) releasing the recording file from litigation-hold status after the preconfigured period of time when there is no access to the recording file.

8 Claims, 17 Drawing Sheets

400

SYSTEM AND METHOD FOR DETECTION AND IMPLEMENTATION OF LITIGATION-HOLD AND RELEASE FOR INTERACTIONS RECORDINGS WITHIN A CONTACT CENTER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of detection and implementation of litigation-hold and release for interactions recordings within a contact center.

BACKGROUND

In contact centers litigation hold or legal hold is a process of preserving call recordings and interactions that are relevant to an ongoing litigation. Preserving call recordings and interaction transcripts for litigation in a contact center can be challenging due to several reasons. First, large volume of interactions makes it difficult to identify and preserve relevant interactions. Sorting through and analyzing vast amounts of data can be time-consuming and costly. Second, contact center call recordings may include multiple parties, languages, and different types of media, such as audio, video, and chat transcripts. This complexity can make it difficult to identify and preserve relevant recordings and can add to the cost and time involved in e-discovery which is a legal process that involves finding, reviewing, and exchanging electronic data as evidence in lawsuits or investigations. Third, the process of identifying and putting relevant interactions under hold is currently a manual process involving agents and supervisors who need to search and identify recordings for ongoing litigations.

Fourth, lifecycle retention policies of interactions in a call center can sometimes result into deletion of interactions after specific time period resulting into loss of important data and evidence. Fifth, failure to preserve relevant interactions can result into compliance issues, financial loss and brand damage, and sixth, an automated system for detecting potentially litigious interactions and preserving them by placing them on litigation hold until their purpose is served is necessary. Once the litigation hold has served its purpose, the relevant interactions can be released.

Therefore, there is a need for a technical solution for detection and implementation of litigation-hold and release for files of interactions recordings within a contact center.

SUMMARY

There is thus provided, in accordance with some embodiments of the present disclosure, a computerized-method for detection and implementation of litigation-hold and release for interactions recordings within a contact center.

Furthermore, in accordance with some embodiments of the present disclosure, the computerized-method may include for each recording file of an interaction between a customer and an agent in the contact center: (i) retrieving interaction metadata and interaction analysis; (ii) calculating a Litigation Likelihood Score (LLS) for a recording file of the interaction based on the retrieved interaction metadata and interaction analysis; (iii) setting the recording file on litigation-hold status when the LLS is above a preconfigured threshold for a preconfigured period of time; (iv) checking if there was access to the recording file after the preconfigured period of time has elapsed; and (v) releasing the recording file from litigation-hold status after the preconfigured period of time when there is no access to the recording file.

Furthermore, in accordance with some embodiments of the present disclosure, the interaction metadata may include at least one of: (i) interaction identifier; (ii) duration of interaction; (iii) participants involved in the interaction; (iv) communication channels; (v) sentiment; (vi) intent of interaction; and (vii) compliance terms.

Furthermore, in accordance with some embodiments of the present disclosure, the interaction analysis may include at least one of: (i) number of explicit terms mentioned; (ii) number of terms; (iii) frequency of each emotion term; (iv) frequency negative sentiment term; (v) total number of terms in interaction; (vi) one or more high value attribute; (vii) one or more intent indicators; and (viii) one or more loss indicators; (ix) one or more compliance factors; (x) frequency of credibility terms; and (xi) number of past litigations with similar context.

Furthermore, in accordance with some embodiments of the present disclosure, the calculating of the LLS may be performed according to formula I:

$$LLS = \sqrt[3]{\frac{ThreatScore(TS)\times}{LitigationSentiment(LS)\times LitigationImpactScore(LIS)}} \tag{I}$$

whereby:
TS is calculated according to formula II:

$$\begin{aligned} TS = {} & \text{w\_1} \times (\text{Explicitness score}) + \\ & \text{w\_2} \times (\text{Credibility Score}) + \text{w\_3} \times (\text{Compliance score}) + \\ & \text{w\_4} \times (\text{Historic Litigation Likelihood Score } (HLLS)), \end{aligned} \tag{II}$$

whereby:
w_1-w_4 are preconfigured weights, $$\text{Explicitness Score} = (\text{number of explicit terms mentioned})/(\text{total number of terms}),$$

$$\text{Credibility Score} = \sum_{i=1}^{n} (\text{frequency of credibility term } (i) \times W(i)),$$

whereby:
W(i) is a weight assigned to a credibility term (i), $$\text{Compliance Score} = \sum_{j=1}^{m} (\text{compliance factors } (j) \times W(j)),$$

and

W(j) is a weight assigned to a compliance factor (j), $$HLLS = \text{total number of similar interactions}/\text{number of past litigations with similar context},$$

LS is calculated according to formula III:

$$LS = w\_5 \times (\text{emotional sentiment}) + w\_6 \times (\text{negative sentiment}) + w\_7 \times (\text{perceived intent}) + w\_8 \times (\text{risk aversion}), \quad \text{(III)}$$

whereby:

w_5-w_8 are preconfigured weights, $$\text{emotional sentimant} = \sum\nolimits_{k=1}^{l} (\text{frequency of emotion term } (k) \times W(k)),$$

$$\text{negative sentiment} = \frac{\sum\nolimits_{l=1}^{p} (\text{frequency negative sentiment term } (l) \times W(l))}{\text{total number of terms in interaction}}$$

$$\text{preceived intent} = \sum\nolimits_{r=1}^{q} (\text{Intent Indicator } (r) \times W(r), \text{ and}$$

$$\text{risk aversion} = \frac{\text{number of past legal disputes}}{\text{total number of interatcions}},$$

whereby:

number of past legal disputes is a number of disputes during the preconfigured period, total number of interactions is a number of interactions where customer was involved, LIS is calculated according to formula IV:

$$LIS = w\_9 \times (\text{interaction value}) + w\_10 \times (\text{potential loss probability}) + w\_11 \times (\text{impact score}) + w\_12 \times (\text{timeline of an issue related to the recording file of the interaction}), \quad \text{(IV)}$$

whereby:

w_9-w_12 are preconfigured weights, $$\text{Interaction Value} = \sum_{t=1}^{k} (\text{high value attribute } (t) \times W(t))$$

whereby:

high-value attribute (t) is a binary value, '1' if the attribute is present, '0' if not, Wt is the weight assigned to high-value attribute (t) based on its importance, and k is a number of different high-value attributes considered, $$\text{Potential Loss Probability} = \sum_{i=1}^{n} (\text{loss indicator } (i) \times W(i))$$

$$\text{impact score} = \text{severity of impact} \times \text{probability of litigation},$$

whereby:

severity of impact is a weighted value based on a parameter of potential consequences of litigation, and probability of litigation is a parameter that is derived from other factors, $$\text{timeline of an issue related to the recording file of the interaction} = \log(\text{duration of the issue in days} + 1)$$

whereby:

duration of the issue in days is a period of time since the issue raised by the customer in the interaction.

Furthermore, in accordance with some embodiments of the present disclosure, the litigation-hold status may include at least one of: (i) prevention from deletion; (ii) prevention from editing (iii) prevention from alteration; and (iv) exclusion from data lifecycle processes.

Furthermore, in accordance with some embodiments of the present disclosure, the computerized-method may further include extending the preconfigured period of time of the litigation-hold status when the recording file has been accessed.

Furthermore, in accordance with some embodiments of the present disclosure, the computerized-method may further include setting the recording file on permanent-hold after a preconfigured number of consecutive extending of the preconfigured period of time.

Furthermore, in accordance with some embodiments of the present disclosure, the releasing of the recording file from litigation-hold status after the preconfigured period of time is further when there is no litigation-hold status selection from a user via a Graphical User Interface (GUI).

There is thus provided a computerized-system for detection and implementation of litigation-hold and release for interactions recordings within a contact center. The computerized-system may include: an interactions database, a recording files database, one or more processors; and a memory to store the interactions database. For each recording file of an interaction between a customer and an agent in the contact center operating the one or more processors to: (i) retrieve interaction metadata and interaction analysis from the interactions database; (ii) calculate a Litigation Likelihood Score (LLS) for a recording file of the interaction based on the retrieved interaction metadata and interaction analysis; (iii) set the recording file in the recording files database on litigation-hold status when the LLS is above a preconfigured threshold for a preconfigured period of time; (iv) check if there was access to the recording file after the preconfigured period of time has elapsed; and (v) release the recording file in the recording files database from litigation-hold status after the preconfigured period of time when there is no access to the recording file.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "recording file of an interaction", as used herein relates to an audio file that includes recording of a traditional interaction and related transcript and also to a transcript of a digital interaction, such as email and chat.

Figure 1A:
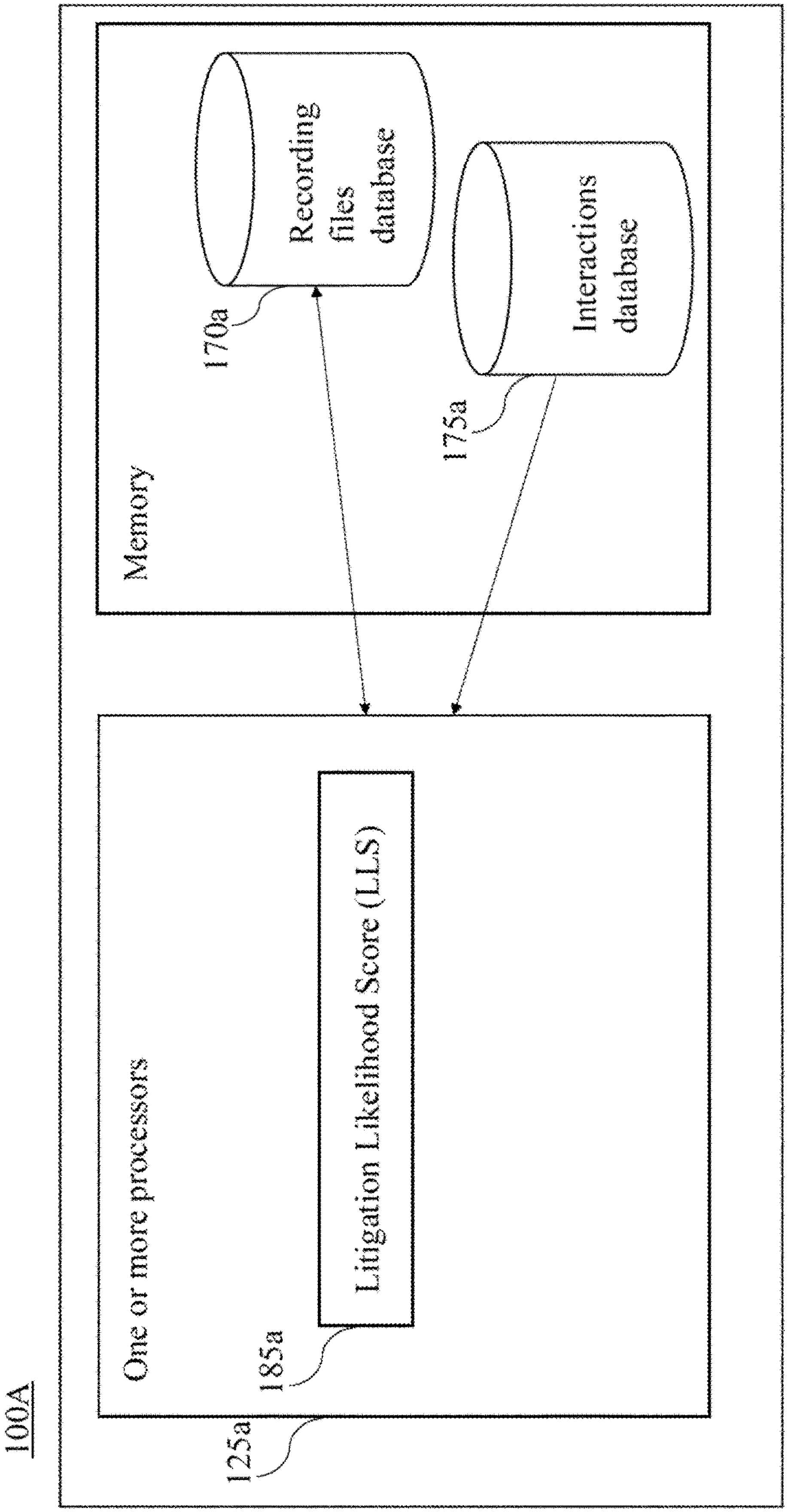
FIGS. 1A-1B schematically illustrate a high-level diagram of a system for detection and implementation of litigation-hold and release for interactions recordings within a contact center, in accordance with some embodiments of the present disclosure.

FIG. 1A schematically illustrates a high-level diagram of a system 100A for detection and implementation of litigation-hold and release for interactions recordings within a contact center, in accordance with some embodiments of the present disclosure.

According to some embodiments of the present disclosure, in a contact center, each interaction between a customer and an agent is recorded and stored as a recording file of the interaction in a recording files database 170*a* with related transcript. When the customer has litigation issues or is prone to have such, the recording files of each interaction of the customer may be set for litigation-hold status. During the time that a recording file is in litigation-hold status, the recording file may not be deleted from the database 170*a*. The recording files may be released from the litigation-hold status after the litigation issues are resolved or after a preconfigured time that the recording files were not accessed, e.g., used for the litigation process.

According to some embodiments of the present disclosure, a system, such as system 100A may detect and implement litigation-hold and release for interactions recordings within a contact center. For each recording file of an interaction between a customer and an agent in the contact center, that is stored in the recording files database 170*a*, the one or more processors 125*a* may retrieve interaction metadata and interaction analysis from a database, such as interactions database 175*a*. The detection and implementation of the litigation-hold and release for interactions recordings within the contact center may be operated for each interaction in the interactions database 175*a*.

According to some embodiments of the present disclosure, system 100A may implement a mechanism to preserve recording files of interactions that may be needed for future legal or compliance reasons. The recording files may be preserved by placing them on litigation-hold status for a preconfigured period of time which may be extended based on access activity, with a maximum number of extensions allowed.

According to some embodiments of the present disclosure, after the maximum number of extensions has been tracked, the recording files of the interactions can either be placed on a permanent-hold status or be automatically released, depending on the system's settings. For example, if there was no access to the recording file during the last extension period the recording file may be automatically released. Otherwise, the recording file may be placed on a permanent-hold status and may be only manually released.

According to some embodiments of the present disclosure, the interaction metadata may include interaction identifier that is used to uniquely distinguish each interaction. It enables specific interactions, such as call recordings or emails, to be located and placed on litigation hold when needed. The interaction metadata may further include duration of interaction, and the participants involved in the interaction. The participants involved in an interaction within a contact center include customers, agents, supervisors, or any other participant part of given interaction. The participants associated with an interaction are also used to establish context of the interaction, and to filter or query, link related interactions and the like. The interaction metadata may also include communication channels, sentiment, intent of interaction, which is the purpose of the interaction; and compliance terms.

According to some embodiments of the present disclosure, compliance factors or terms are additional metadata such as data privacy rule, such as General Data Protection Regulation (GDPR), California Consumer Privacy Act (CCPA) and the like, any retention policies, security standards like Peripheral Component Interconnect Data Security Standard (PCI DSS) or access control related information.

According to some embodiments of the present disclosure, the interaction analysis may include at least one of: (i) number of explicit terms mentioned; (ii) number of terms; (iii) frequency of each emotion term; (iv) frequency negative sentiment term; (v) total number of terms in interaction; (vi) one or more high value attribute; (vii) one or more intent indicators; (viii) one or more loss indicators; (ix) one or more compliance factors; (x) frequency of credibility terms; and (xi) number of past litigations with similar context.

According to some embodiments of the present disclosure, a Litigation Likelihood Score (LLS) 185*a* for the recording file of the interaction, may be calculated based on the retrieved interaction metadata and interaction analysis.

According to some embodiments of the present disclosure, the recording file may be automatically set on litigation-hold status when the LLS 185*a* is above a preconfigured threshold for a preconfigured period of time.

According to some embodiments of the present disclosure, after computing the Litigation Likelihood Score (LLS), it may be compared to a predefined threshold 'T'. The threshold may be configurable to a range between 0 and 10, reflecting a probability between 0% and 100%. If the LLS exceeds T, the interaction is confidently placed under "System Hold", e.g., litigation-hold status. Otherwise, the interaction and its related recording file may not be subjected to a system hold.

According to some embodiments of the present disclosure, when a recording file of an interaction may be set on litigation-hold status, the recording file may not be deleted until the litigation-hold status is released, the recording file may not be edited or altered and preserved in its original state and the recording file may be excluded from lifecycle management processes, such as archiving or purging.

According to some embodiments of the present disclosure, the LLS value may be in a range of '0' to '10 scale. The preconfigured threshold may indicate a percentage probability of litigation for the interaction. For example, when the preconfigured threshold is set at 6, it may imply that interactions where the risk of litigation or compliance risk may be assessed to be 60% or higher.

According to some embodiments of the present disclosure, for example, high threshold, e.g., 8-10 or 80-100% may be in case litigation holds should be minimized to only the highest-risk interactions. Moderate threshold, e.g., 5-7 or 50-70%, may capture a broader range of interactions, flagging both high and moderate risk levels. Low threshold, e.g., 2-4 or 20-40% may be applicable when there is a need to be conservative as to interactions related to litigation and the associated recording file, flagging even lower-risk interactions.

According to some embodiments of the present disclosure, the LLS may be calculated according to formula I:

$$LLS = \sqrt[3]{ThreatScore\,(TS) \times LitigationSentiment\ (LS) \times LitigationImpactScore\ (LIS)} \tag{I}$$

According to some embodiments of the present disclosure, the LLS may provide a comprehensive risk assessment by integrating the probability of a legal threat, the sentiment of the interaction, and the potential impact of litigation. This combined score enables proactive risk management, prioritization of high-risk interactions, and informed decision-making to mitigate potential legal issues.

According to some embodiments of the present disclosure, for example, when an interaction with an LLS above a preconfigured threshold may be identified the system automatically flags the interaction for litigation hold. This process ensures that the data related to the interaction is preserved in a non-erasable and non-rewriteable format to comply with legal hold requirements and regulations.

According to some embodiments of the present disclosure, a low value in any of the component scores of the LLS may significantly lower the total LLS score. By combining the three different dimensions of risk, e.g., threat, sentiment and impact, the LLS may provide a more comprehensive and nuanced risk assessment than any single score alone.

According to some embodiments of the present disclosure, the Threat Score (TS) may be calculated according to formula II:

$$TS = \text{w\_1} \times (\text{Explicitness score}) + \text{w\_2} \times (\text{Credibility Score}) + \text{w\_3} \times (\text{Compliance score}) + \text{w\_4} \times (\text{Historic Litigation Likelihood Score } (HLLS)), \tag{II}$$

whereby:

w_1-w_4 are preconfigured weights, $$\text{Explicitness Score} = (\text{number of explicit terms mentioned})/(\text{total number of terms}),$$

$$\text{Credibility Score} = \sum_{i=1}^{n} (\text{ frequency of credibility term}(i) \times W(i)),$$

whereby:

W(i) is a weight assigned to a credibility term (i), $$\text{Compliance Score} = \sum_{j=1}^{m} (\text{ compliance factors}(j) \times W(j)), \text{ and}$$

W(j) is a weight assigned to a compliance factor (j), $$HLLS = \text{total number of similar interactions}/\text{number of past litigations with similar context.}$$

According to some embodiments of the present disclosure, the TS may assess the probability of a legal threat in an interaction by analyzing explicit litigation-related terms, the customer's credibility, compliance factors, and historical data on similar cases. This score, as a vital part of the LLS calculation, may indicate high-risk interactions and enables proactive management by integrating these risk assessments into broader litigation preparedness and response strategies.

According to some embodiments of the present disclosure, the explicit terms may be identified from a preconfigured list of terms.

According to some embodiments of the present disclosure, the litigation sentiment score may be calculated according to formula III:

$$LS = \text{w\_5} \times (\text{emotional sentiment}) + \text{w\_6} \times (\text{negative sentiment}) + \text{w\_7} \times (\text{perceived intent}) + \text{w\_8} \times (\text{risk aversion}), \quad \text{(III)}$$

whereby:
w_5-w_8 are preconfigured weights, $$\text{emotional sentiment} = \sum_{k=1}^{l} (\text{ frequency of emotion term}(k) \times W(k))$$

$$\text{negative sentiment} = \frac{\sum_{l=1}^{p} (\text{ frequency negative sentiment term}(l) \times W(l))}{\text{total number of terms in interaction}}$$

$$\text{perceived intent} = \sum_{r=1}^{q} (\text{ Intent indicator}(r) \times W(r)), \text{ and}$$

$$\text{risk aversion} = \frac{\text{number of past legal disputes}}{\text{total number of interactions}},$$

whereby:

number of past legal disputes is a number of disputes which are related to the customer, during the preconfigured period, and total number of interactions is the number of interactions where customer was involved, during the preconfigured period.

According to some embodiments of the present disclosure, the LS may evaluate the overall sentiment of the interaction. Negative emotions, negative sentiment words, perceived intent from the agent's responses, and the customer's historical tendency for legal disputes may be considered. The LS score may reflect customer dissatisfaction and potential for conflict.

According to some embodiments of the present disclosure, the LIS may be calculated according to formula IV:

$$LIS = \text{w\_9} \times (\text{interaction value}) + \text{w\_10} \times (\text{potential loss probability}) + \text{w\_11} \times (\text{impact score}) + \text{w\_12} \times (\text{timeline of an issue related to the recording file of the interaction}), \quad \text{(IV)}$$

whereby:
w_9-w_12 are preconfigured weights, $$\text{Interaction Value} = \sum_{t=1}^{k} (\text{high value attribute}(t) \times W(t))$$

whereby:
high-value attribute (t) is a binary value, '1' if the attribute is present, '0' if not,
Wt is the weight assigned to high-value attribute (t) based on its importance, and
k is a number of different high-value attributes considered, $$\text{Potential Loss Probability} = \sum_{i=1}^{n} (\text{ loss indicator}(i) \times W(i))$$

$$\text{timeline of an issue related to the recording file of the interaction} = \log(\text{duration of the issue in days} + 1),$$

whereby:
duration of the issue in days is a period of time since the issue raised by the customer in the interaction.

According to some embodiments of the present disclosure, the LIS may estimate the potential repercussions of litigation by considering the interaction's value, potential loss probability, the impact on the customer, and the duration of the issue. The LIS may indicate an assessment of the significance of potential litigation, supporting strategic decision-making and resource allocation.

According to some embodiments of the present disclosure, the credibility term in the frequency of credibility term relates to a parameter of personal credentials with reference to past legal actions. Mention of personal credentials, during the interaction, refers to customers citing professional titles or expertise, such as "As a lawyer, I know my rights", indicating authority and a higher likelihood of following through with threats. Reference to past legal actions, during the interaction, refers to customers mentioning prior lawsuits or disputes, for example, "I sued another company for this issue", showing experience with the legal system and seriousness in pursuing actions. Mention of consumer protection agencies or legal bodies, during the interaction, refers to customers citing organizations, like the Better Business Bureau, for example, "I'm filing a complaint with the FTC", during the interaction, often a precursor to official complaints or legal action. From interaction analytics, scores and parameters for these details are provided (120*b*).

According to some embodiments of the present disclosure, the compliance factors in the calculation of the compliance score relate to data privacy rules under GDPR, CCPA and the like. The Litigation Rules/Compliance Factors Score is designed to evaluate whether an interaction adheres to specific litigation rules and compliance requirements mandated by customers, regulatory bodies, or industry standards. This score ensures that interactions are managed within the boundaries of legal and regulatory frameworks, mitigating potential legal risks.

According to some embodiments of the present disclosure, the HILLS calculation that is based on total number of similar interactions divided by the number of past litigations with similar context. The similarity between interactions may be determined by using pre-calculated litigation detection factors for each interaction, which can be compared to assess the similarity between two interactions and their context.

According to some embodiments of the present disclosure, for example, an interaction is evaluated based on its similarity to past interactions using pre-calculated litigation detection factors. Historical data shows the total number of similar interactions and the number of litigations arising from such contexts. The HLLS is calculated as: HLLS=total number of similar interactions/number of past litigations with similar context, For example, if there are 500 similar interactions and 25 led to litigation, the HILLS is 20. This means that 1 in every 20 similar interactions resulted in litigation. A lower HLLS indicates a higher likelihood of escalation, helping prioritize cases for resolution or legal attention.

According to some embodiments of the present disclosure, by standardizing and scoring these pre-calculated litigation detection factors, it may be identified how close one interaction resembles to another, particularly those with past litigation outcomes. This comparison of pre-calculated factors may be used to calculate a similarity score which may be used to identify interactions with similar contexts and potential litigation risk based on established patterns.

According to some embodiments of the present disclosure, once the HILLS is calculated, it may be used to group similar interactions based on their HLLS scores. This grouping may be used to analyze the outcome by examining the number of interactions with similar HLLS scores and determining how many of them resulted in litigation. The number of past litigations with similar context and the total number of similar interactions in the past may be retrieved from the interactions database 175*a*, the recording files database 170*a* and interaction analytics tools, such as NLP.

According to some embodiments of the present disclosure, the HLLS assesses the likelihood of litigation based on historical data. The HLLS leverages patterns from past interactions that resulted in litigation to predict the likelihood of future litigation.

According to some embodiments of the present disclosure, the high-value attribute (t) is a binary value which indicates if the attribute is present '1' or not '0' and may be related to one or more terms, such as involvement of financial information, confidential or sensitive data, high-value purchases, and business-critical transactions. The interaction value may be higher when there are more such terms, e.g., attributes.

According to some embodiments of the present disclosure, the timeline of an issue related to the recording file of the interaction measures the duration the customer has faced a problem. Longer issue durations often increase the likelihood of litigation, as unresolved problems can lead to customer frustration and potential legal action. The duration of the problem faced by the customer may be retrieved from customer service records and interactions database 175*a*.

According to some embodiments of the present disclosure, the interaction value score may assess the value of the interaction, for example, focusing on interactions involving high-value financial or confidential information. Based on this score, interactions that have significant stakes and are more likely to result in litigation if not handled properly may be prioritized. The attributes that may be considered are involvement of financial information, handling of confidential or sensitive data, high-value purchases or services and business-critical transactions. The data may be retrieved from interaction metadata, transaction records, customer profiles and interaction logs.

According to some embodiments of the present disclosure, the potential loss probability score may measure the probability of potential loss or financial issues faced by the customer, which may drive them towards litigation. Based on this score interactions that pose significant financial or safety risks to the customer may be identified. The loss indicators that may be considered are mention of potential financial loss, safety concerns or health risks, issues with essential services and mention of significant financial loss or potential loss. The data may be retrieved from interaction transcripts, customer complaint records and interaction analytics tools, such as CXone Interaction analytics application, which is an intelligent linguistic analytics application. The CXone Interaction analytics, converts contact center interactions into keywords and metrics.

According to some embodiments of the present disclosure, the perceived intent score may evaluate if the agent's responses lean towards making a commitment or promise, which might be construed as binding and lead to legal action if unfulfilled. Based on this score, interactions where the agent's words might escalate the situation may be identified.

According to some embodiments of the present disclosure, the risk aversion score may identify the tendency of customers or agents to engage in legal disputes based on historical data. Based on this score the propensity for legal actions within the organization may be gauged.

According to some embodiments of the present disclosure, the impact score may quantify the potential impact of litigation if it occurs. This score may reflect the severity and consequences of a potential legal action based on the interaction. The severity of impact, e.g., financial loss, reputational damage, and probability of litigation based on interaction content may be retrieved from historical impact data, expert evaluations and risk assessment derived from Litigation impact score.

According to some embodiments of the present disclosure, the compliance score may assess if the interaction meets the litigation rules and compliance requirements set by the customer or regulatory bodies. This score is an assessment if interactions are managed according to legal and regulatory standards. The compliance factors may be, for example, regulatory and compliance requirements, customer-specific litigation rules and adherence to industry standards. The data may be retrieved from a compliance database, regulatory guidelines and customer-specific rules and policies.

According to some embodiments of the present disclosure, the interaction metadata and dispositions. Disposition is a label or tag that describes the outcome of a customer interaction which may provide additional context about the interaction. This may assess the risk and importance of the interaction based on structured data fields. Based on disposition codes the outcome of the interaction such as unresolved or escalating issues may be indicated. The metadata details that may be used are timestamps, participants and interaction type and disposition codes indicating the outcome or categorization of the interaction. The data may be retrieved from the interactions database 175*a*, contact center software and interaction logs and analytics tools. For example, in a contact center, each customer service call is tagged with a disposition code that summarizes the call's outcome, such as "Resolved," "Escalated," or "Unresolved." These codes, along with metadata like call timestamps and participant details, are analyzed to assess customer service effectiveness and identify potential risk areas, such as legal issues.

According to some embodiments of the present disclosure, the recording file may be set on litigation-hold status when the LLS is above a preconfigured threshold, for a duration of preconfigured period of time. After the preconfigured period of time has elapsed, the one or more processors 125*a* may operate a check if there was access to the recording file, for example, by retrieving and checking the recorded count of interaction accesses, which is updated each time the interaction is accessed and retrieved.

According to some embodiments of the present disclosure, the recording file may be released from litigation-hold status after the preconfigured period of time, when there is no access to the recording file, by checking if there was access to the recording file after the preconfigured period of time has elapsed.

According to some embodiments of the present disclosure, the litigation-hold status may include prevention of deletion of the recording file from the recording files database, prevention from edition or alteration of the recording file and exclusion of the recording file from interaction lifecycle management processes which are user-defined rules that dictate actions such as deleting, modifying, copying, or moving interactions after a specified period.

According to some embodiments of the present disclosure, the preconfigured period time of the litigation-hold status may be automatically extended when the recording file has been accessed during the preconfigured period of time. The extension of time for the litigation-hold status may be for an additional preconfigured period of time.

According to some embodiments of the present disclosure, the recording file may be set on permanent-hold after tracking of a preconfigured number of consecutive extending of the preconfigured period of time.

According to some embodiments of the present disclosure, the automatic release of the recording file from litigation-hold status after the preconfigured period of time may be further operated when there is no litigation-hold status selection from a user via a Graphical Interface (GUI). For example, as shown in GUI 400 in FIG. 4.

Figure 1B:
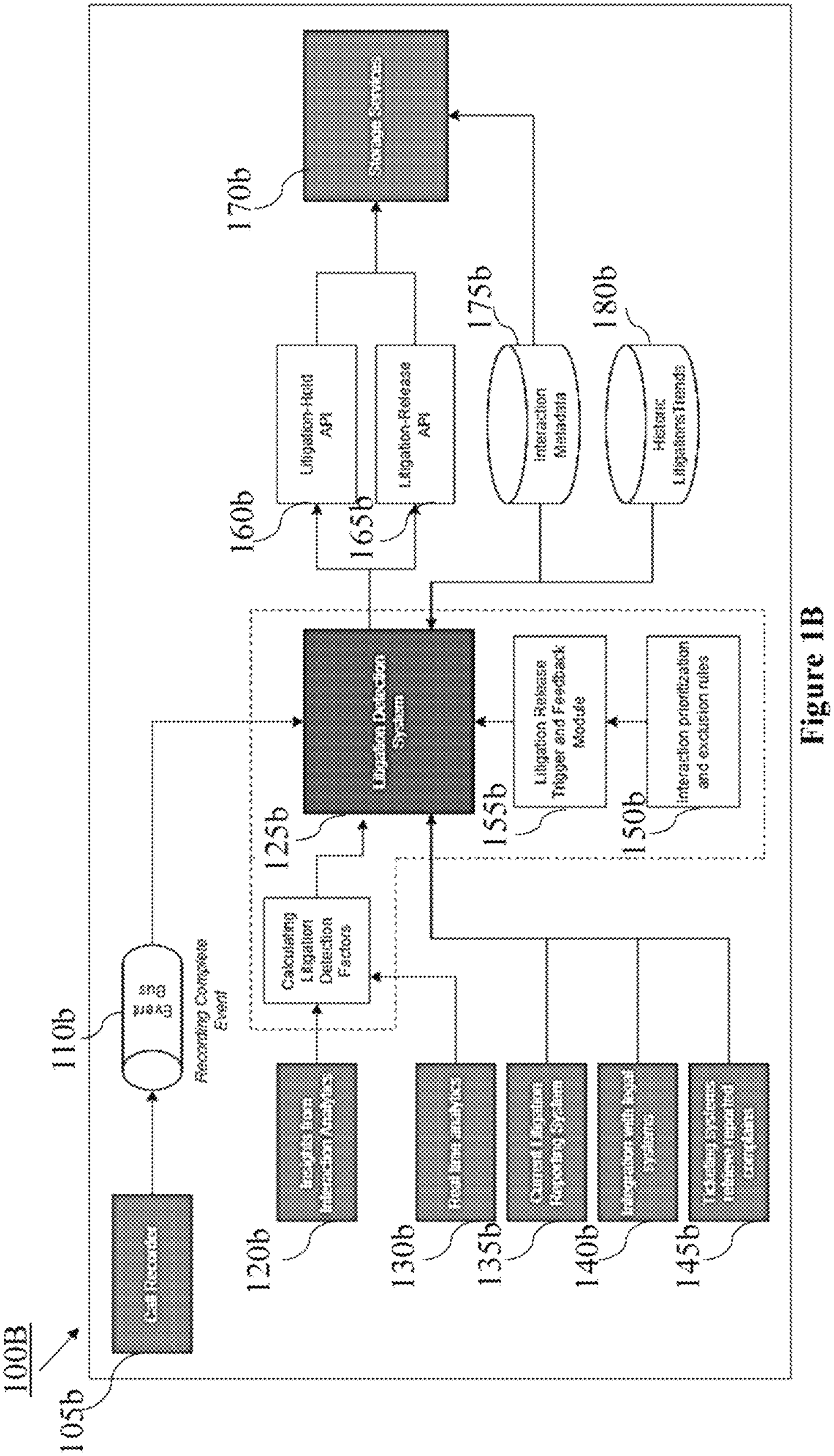

FIG. 1B schematically illustrates a high-level diagram of a system 100B for detection and implementation of litigation-hold and release for interactions recordings within a contact center, in accordance with some embodiments of the present disclosure.

According to some embodiments of the present disclosure, system 100B may include similar components, as in system 100A in FIG. 1A.

According to some embodiments of the present disclosure, a system, such as system 100B may automatically detect litigation process or likelihood of litigation that is related to a customer of an interaction. The system 100B may categorize interactions, e.g., recording file of the interaction, in a contact center, based on the likelihood of litigation and importance of the interaction.

According to some embodiments of the present disclosure, system 100B may automatically detect and put interactions, e.g., recording files of the interactions, under system-hold mode, e.g., litigation-hold status, for a specified amount of time, and then automatically release the interactions from the system-hold mode. During the system-hold mode, a file, such as an interaction recording file, may be placed in a safeguard state within storage, such as storage services 170*b*, and such as recording files database 170*a* in FIG. 1A, which is shielding the file from all deletion efforts and data lifecycle processes.

According to some embodiments of the present disclosure, to automatically detect and put the file under litigation-hold status, litigation detection system 125*b*, such as system 100A in FIG. 1A, may retrieve input from multiple entities, such as insights from interaction analytics 120*b*, insights from real time analytics 130*b*, interaction analytics and dispositions, metadata of the interaction, that may be stored in the interaction metadata database 175*b*, inputs from historic pattern of litigations which may be stored in the historic litigation trends database 180*b* and the like. Current litigation reporting system 135*b*, integration with legal systems 140*b* where requests are submitted or received from third parties or legal advisors to access specific interactions for litigation purposes, ticketing systems retrieve reported complaints 145*b*.

According to some embodiments of the present disclosure, insights from real time analytics 130*b* may be sentiment trends, frequently mentioned topics, escalation rates, and compliance alerts. Disposition is a label or tag that describes the outcome of a customer interaction. A real-time interaction analytics 120*b* may be a live or near-live information that displays key insights and metrics from ongoing customer interactions.

According to some embodiments of the present disclosure, system 100B may utilize an Application Programming Interface (API) from a platform cloud storage to perform the system-hold, e.g., set the file on litigation-hold status, API 160*b* and release operations of the recording file in a seamless manner, e.g., litigation-release API 165*b*. The utilization of the APIs 160*b* and 165*b*, to perform the litigation-hold and release, may ensure compatibility with various storage platforms and simplifying of the implementation and integration of litigation detection system 125*b*. The litigation-hold API 160*b* may be used to automatically place interactions with high litigation probability on litigation-hold, to preserve them for a specified amount of time. The litigation-release API may be used to automatically release interactions after the hold duration expires or if they no longer meet the criteria for litigation risk.

According to some embodiments of the present disclosure, system 100B may implement a continuous feedback loop to improve the decision-making process by operating a feedback module 155*b*.

According to some embodiments of the present disclosure, the feedback module 155*b* may operate a continuous feedback loop which may be triggered after a litigation release of the recording file may be used to enhance decision-making process. This feedback loop may collect and analyze outcomes from previous decisions and use this information to refine the system's predictive Machine Learning (ML) models to improve accuracy and adapt to changing patterns over time. The predictive Machine Learning models referred to in this context are models designed to identify and assess the likelihood of litigation or compliance-related issues in interactions. These models use historical data and feedback from outcomes to refine their predictions and decision-making processes. The ML models can be NLP models, classification models like logistic regression, decision trees and the like.

According to some embodiments of the present disclosure, the ML models may be implemented within a dedicated ML framework or infrastructure, which could be integrated into the system as a service. These ML models may run on a separate server or in a cloud-based environment, where they can handle large data sets and complex computations effectively. The ML model employed for the Litigation Likelihood Feedback Model incorporates various inputs including sentiment analysis scores, mentions of legal terms or entities, interaction history, and resolution outcome data. In the feedback loop, the outcomes from interactions identified as high risk are utilized to refine the model's prediction accuracy. This evaluation covers the outcomes of flagged interactions, assessing whether they resulted in litigation, achieved customer resolution, or led to no further action. Such insights are instrumental in enhancing decision-making processes and better prioritizing future customer interactions.

According to some embodiments of the present disclosure, a feedback module score may be calculated according to formula (V):

$$\text{Feedback Module Score } (P_{refined}) = P_{initial} + \alpha * F(\text{outcome, features}) \quad (V)$$

whereby:

$P_{initial}$: The initial prediction from the model (e.g., litigation likelihood score).

α: A learning rate or weighting factor that controls the impact of the feedback on the refined prediction.

F (outcome, features): The feedback function that adjusts the model based on the difference between actual outcomes and predicted outcomes, using features of the interaction.

Example: $F(\text{outcome, features})=(\text{outcome-}P_{initial})*G(\text{features})$ Outcome: Actual result (e.g., litigation occurred or not).

G (features): Feature adjustment function accounting for the attributes of the interaction.

$P_{refined}$: The updated prediction after incorporating feedback.

According to some embodiments of the present disclosure, the feedback module ensures the system refines its predictive model over time by learning from the outcomes of previous decisions, adapting to changes, and improving future predictions. For example, if the initial litigation likelihood score (LLS) $P_{initial}=0.5$, the actual outcome indicates no litigation (outcome=0), and the feedback adjustment function reduces the likelihood by 0.2 (F (outcome, features)=−0.2), then: $P_{refined}=0.6+\alpha*(-0.2)$, for α=0.5, the refined prediction becomes $P_{refined}=0.6-0.1=0.5$.

According to some embodiments of the present disclosure, if the model initially predicts a litigation likelihood score of 0.6 for an interaction, but the feedback indicates no litigation occurred, the feedback module reduces the score by applying an adjustment derived from the mismatch. The updated prediction becomes more aligned with observed outcomes, improving the system's accuracy over time. This feedback-driven refinement process allows the system to adapt to changing patterns, improve prediction accuracy, and optimize decision-making in dynamic environments.

According to some embodiments of the present disclosure, for each recording file of an interaction in the contact center, system 100B may calculate a Litigation Likelihood Score (LLS) for a recording file of the interaction based on the retrieved interaction metadata and interaction analysis. The LLS may be calculated based on a Threat Score (TS), a Litigation Sentiment Score (LSC) and a Litigation Impact Score (LIS).

According to some embodiments of the present disclosure, the threat score may be calculated to determine the overall probability of a legal threat in the interaction. The litigation sentiment score may be calculated to assess the overall sentiment of the interaction, considering negativity, intent and potential for legal threats. The litigation impact score may be calculated to estimate the overall probability of litigation, should it occur.

According to some embodiments of the present disclosure, the threat score may be calculated according to formula II:

$$TS = w\_1 \times (\text{Explicitness score}) + w\_2 \times (\text{Credibility Score}) + w\_3 \times (\text{Compliance score}) + w\_4 \times (\text{Historic Litigation Likelihood Score } (HLLS)), \quad (II)$$

whereby:

w_1-w_4 are preconfigured weights, $$\text{Explicitness Score} = (\text{number of explicit terms mentioned})/(\text{total number of terms}),$$

$$\text{Credibility Score} = \sum_{i=1}^{n} (\text{ frequency of credibility term}(i) \times W(i)),$$

whereby:

W(i) is a weight assigned to a credibility term (i), $$\text{Compliance Score} = \sum_{j=1}^{m} (\text{ compliance factors}(j) \times W(j)), \text{ and}$$

and

W(j) is a weight assigned to a compliance factor (j), and $$HLLS = \text{total number of similar interactions}/\text{number of past litigations with similar context.}$$

According to some embodiments of the present disclosure, the litigation sentiment score may be calculated according to formula III:

$$LS = w\_5 \times (\text{emotional sentiment}) + w\_6 \times (\text{negative sentiment}) + w\_7 \times (\text{perceived intent}) + w\_8 \times (\text{risk aversion}), \quad (III)$$

whereby:

w_5-w_8 are preconfigured weights, $$\text{emotional sentiment} = \sum_{k=1}^{l} (\text{frequency of emotion term}(k) \times W(k))$$

$$\text{negative sentiment} = \frac{\sum_{l=1}^{p} (\text{frequency of negative term}(l) \times W(l))}{\text{total number of terms in interaction}}$$

$$\text{perceived intent} = \sum_{r=1}^{q} (\text{Intent Indicator}(r) \times W(r)), \text{ and}$$

$$\text{risk aversion} = \frac{\text{number of past legal disputes}}{\text{total number of interactions}},$$

whereby:

number of past legal disputes is a number of disputes during the preconfigured period, and total number of interactions is the number of interactions where customer was involved.

According to some embodiments of the present disclosure, the litigation impact score may be calculated according to formula IV:

$$LIS = w\_9 \times (\text{interaction value}) + w\_10 \times (\text{potential loss probability}) + w\_11 \times (\text{impact score}) + w\_12 \times (\text{timeline of an issue related to the recording file of the interaction}),$$

whereby:
w_9-w_12 are preconfigured weights, $$\text{Interaction Value} = \sum_{t=1}^{k} (\text{ high value attribute}(t) \times W(t))$$

whereby:
high-value attribute (t) is a binary, value, '1' if the attribute is present, '0' if not,
Wt is the weight assigned to high-value attribute (t) based on its importance, and
k is a number of different high-value attributes considered, $$\text{Potential Loss Probability} = \sum_{i=1}^{n} (\text{ loss indicator}(i) \times W(i))$$

$$\text{impact score} = \text{severity of impact} \times \text{probability of litigation}$$

whereby:
severity of impact is a weighted value based on a parameter of potential consequences of litigation, and
probability of litigation is a parameter that is derived from other factors, $$\text{timeline of an issue related to the recording file of the interaction} = \log(\text{duration of the issue in days} + 1)$$

whereby:
duration of the issue in days is a period of time since the issue raised by the customer in the interaction.

According to some embodiments of the present disclosure, the high value attribute (t) is a binary variable: '1' if the attribute is present in the interaction and '0' if the attribute is absent. W(t) represents the importance or significance of the specific attribute. The weight may be assigned based on business priorities or historical analysis (e.g., customer churn prevention might have a higher weight than interaction duration) and k is a number of attributes considered. The attributes can be derived from the metadata such as High customer sentiment, First contact resolution, Escalation needed, High customer lifetime value and the like.

According to some embodiments of the present disclosure, the LLS may be calculated according to formula I:

$$LLS = \sqrt[3]{ThreatScore\,(TS) \times LitigationSentiment\,(LS) \times LitigationImpactScore\,(LIS)} \quad \text{(II)}$$

According to some embodiments of the present disclosure, for the calculation of the LLS, the interaction metadata and the interaction analysis may be retrieved. The interaction metadata may include interaction identifier, duration of interaction, participants involved in the interaction, and communication channels. A litigation detection system analyzes interactions across multiple communication channels, such as phone calls, emails, chat messages, social media, and video calls. The type of channel or how the interaction was recorded may be used for calculating the LLS. The interaction metadata may also include sentiment, intent of interaction and compliance terms.

According to some embodiments of the present disclosure, the interaction analysis may include number of explicit terms mentioned, number of terms, frequency of each emotion term, frequency negative sentiment term, total number of terms in interaction, one or more high value attribute, one or more intent indicators, one or more loss indicators, one or more compliance factors, frequency of credibility terms, and number of past litigations with similar context.

According to some embodiments of the present disclosure, system 100B may set the recording file on litigation-status when the calculated LLS may be above a preconfigured threshold. The litigation-status may be set for a preconfigured period of time.

According to some embodiments of the present disclosure, the hold-status, e.g., litigation-hold status, may include prevention from the recording file of the interaction being deleted, prevention from edition or alteration of the recording file and exclusion of the recording file from data lifecycle processes.

According to some embodiments of the present disclosure, the preconfigured period of time of the litigation-hold status may be extended when the recording file has been accessed during the preconfigured period of time. The extension of period of time may be for an additional preconfigured period of time.

According to some embodiments of the present disclosure, the recording file may be set on permanent-hold after a preconfigure number of consecutive extending of the preconfigured period of time. The permanent-hold status of the recording file may require active release, as it may not be automatically released after a preconfigured period of time.

According to some embodiments of the present disclosure, the releasing of the recording file from litigation-hold status after the preconfigured period of time may be further operated when there is no litigation-hold status selection from a user via a Graphical User Interface (GUI). For example, a GUI such as GUI 400 in FIG. 4.

According to some embodiments of the present disclosure, system 100B may detect and automatically implement litigation-hold and release for interactions recordings within a contact center based on multiple metrics, e.g., interaction metadata and interaction analysis. System 100B may continuously improve its performance of automated litigation-hold and release of recording files of interactions through feedback loop. The continuous feedback loop implemented in system 100B may refine decision-making process of setting the recording file on litigation-hold status over time and may ensure that system 100B becomes more accurate and efficient with each interaction.

According to some embodiments of the present disclosure, for example, a customer threatens legal action over a billing issue during an interaction. The system assigns a high litigation likelihood score and flags the interaction for escalation. After the case is resolved without litigation, this outcome is fed back into the system. The continuous feedback loop updates the predictive model to better understand the attributes of interactions that result in resolutions versus those that escalate to litigation. Over time, as more outcomes are collected, the system improves its accuracy, adapting to new patterns, such as changes in customer behavior or emerging trends in litigation risks. For instance, it might learn that certain keywords combined with polite tone are less likely to lead to litigation despite a high initial score.

According to some embodiments of the present disclosure, optionally, instead of calculating LLS for the recording file of the interaction a decision as to the litigation probability for the interaction may be made by ML models. Based on the litigation probability, the interaction may be placed on hold, and later, it may be released. The decision to hold or release the recording file can then be analyzed using a feedback module, evaluating the actual decision accuracy. For example, the system collects data on:

Accuracy of predictions (e.g., true positives, false positives).

Patterns in false positives.

The feedback module uses this data to refine the ML model, reducing unnecessary litigation-holds for interactions with lower litigation risks and improving overall accuracy. The ML model may run on a separate server or in a cloud-based environment, where it may leverage datasets and complex computations effectively. The ML model employed for the Litigation Likelihood Feedback Model incorporates various inputs including sentiment analysis scores, mentions of legal terms or entities, interaction history, and resolution outcome data. In the feedback loop, the outcomes from interactions identified as high risk are utilized to refine the model's prediction accuracy. This evaluation covers the outcomes of flagged interactions, assessing whether they resulted in litigation, achieved customer resolution, or led to no further action. Such insights are instrumental in enhancing decision-making processes and better prioritizing future customer interactions.

According to some embodiments of the present disclosure, system 100B may leverage real-time analytics, interaction analytics and historic access patterns to the recording file to adapt and improve its accuracy.

According to some embodiments of the present disclosure, for example, if a recording file is frequently accessed by legal or compliance teams e.g., historical pattern and includes flagged phrases like "breach of contract" which has been identified by real-time analytics, the system can prioritize and refine its detection algorithms to improve the accuracy of identifying high-risk interactions.

According to some embodiments of the present disclosure, system 100B may automatically put recording files of interactions on litigation-hold by identifying the interactions with a high litigation risk, e.g., above a preconfigured threshold, and automatically placing these interactions on litigation-hold in the storage services 170*b*.

According to some embodiments of the present disclosure, the litigation-hold may be extended by system 100B based on access patterns and predefined criteria. Thus, system 100B may automatically adjust the litigation-hold durations based on real-time data and usage patterns. These litigation-hold durations may be considered temporary as after a preconfigured period of time the recording file may be automatically released, when there was no access to the file.

According to some embodiments of the present disclosure, for example, when an interaction is placed under litigation-hold status, it is configured with a predefined threshold, meaning it can be automatically released after a preconfigured period of time, such as 5 days. However, if the interaction is accessed before this preconfigured period of time expires, the litigation-hold status may be extended. If the interaction is accessed frequently enough to exceed the maximum allowed extension threshold, it is put under permanent hold.

According to some embodiments of the present disclosure, the temporary litigation-hold status may be converted into permanent litigation-hold status by system 100B based on evolving legal needs and risk assessments, thus implementing long-term data retention management for legal purposes.

According to some embodiments of the present disclosure, system 100B may operate the litigation detection system 125*b*, for each interaction in the contact center or to a preconfigured one or more types of interactions.

According to some embodiments of the present disclosure, interactions in a database, such as interactions database 175*a* in FIG. 1A, may be prioritized based on the calculated LLS, such that interactions with an LLS above a preconfigured threshold which reflects a high probability of litigation may be identified and examined by exclusion rules. The exclusion rules may be applied to exclude interactions from litigation-hold that do not meet the criteria for litigation risk. The rules may include litigation rules from litigation applications. A rule may be for example, "exclude files meeting certain criteria based on metadata".

According to some embodiments of the present disclosure, the release of an interaction from litigation-hold status may be determined by a litigation release trigger and feedback module 155*b* based on predefined criteria, such as expiration of preconfigured period of time or changes in access patterns to the recording file related to the interaction. The feedback module 155*b* may obtain a continuous feedback loop that may continuously improve the detection and litigation-hold and release processes based on new data and patterns. The implementation of a continuous feedback loop may refine the decision-making process over time. This ensures that the system becomes more accurate and efficient with each interaction.

Figure 2:
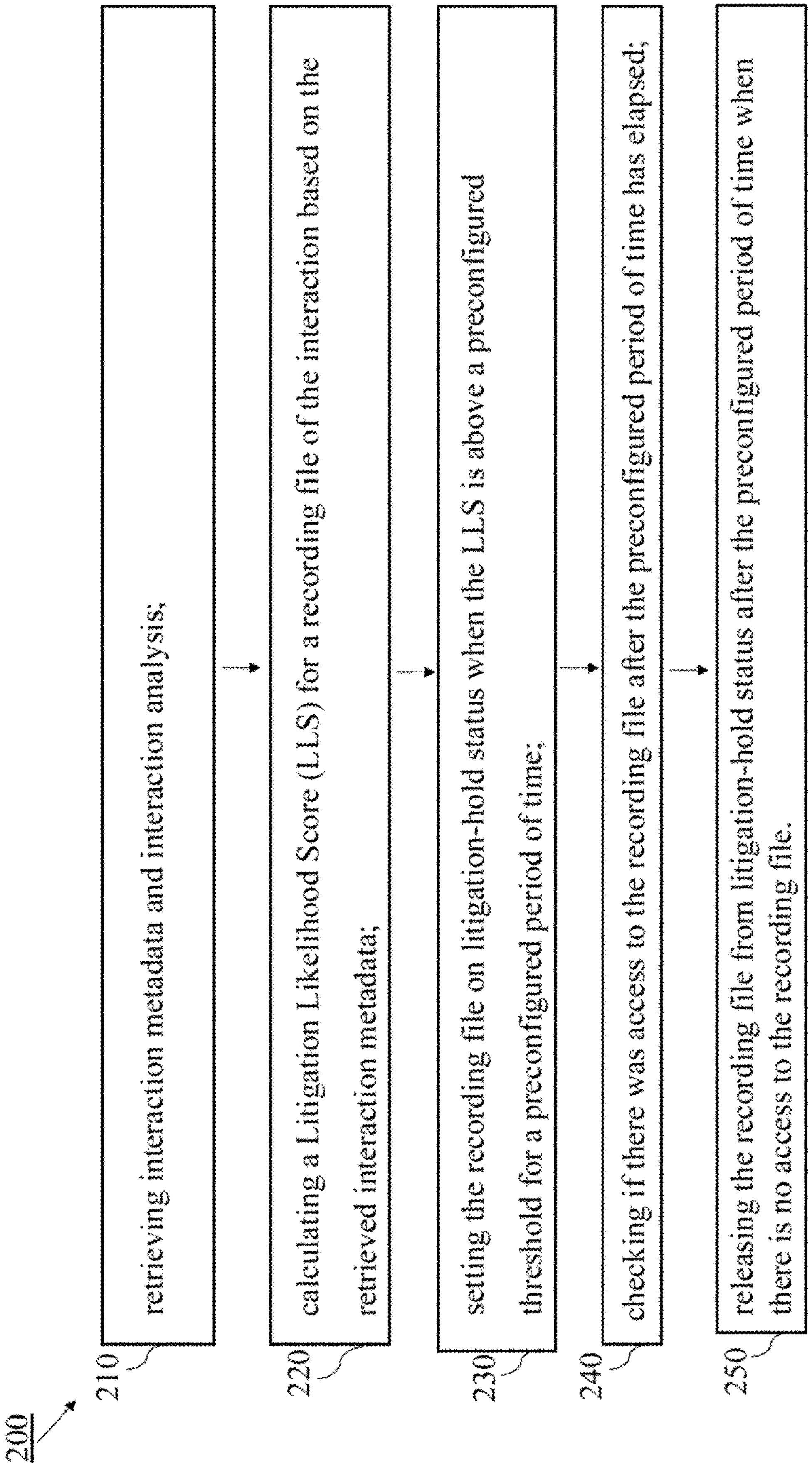
FIG. 2 is a high-level workflow of a computerized-method for detection and implementation of litigation-hold and release for interactions recordings within a contact center, in accordance with some embodiments of the present disclosure.

FIG. 2 is a high-level workflow of a computerized-method 200 for detection and implementation of litigation-hold and release for interactions recordings within a contact center, in accordance with some embodiments of the present disclosure.

According to some embodiments of the present disclosure, for each recording file of an interaction between a customer and an agent in the contact center operating operations 210-240.

According to some embodiments of the present disclosure, operation 210 comprising retrieving interaction metadata and interaction analysis.

According to some embodiments of the present disclosure, operation 220 comprising calculating a Litigation Likelihood Score (LLS) for a recording file of the interaction based on the retrieved interaction metadata.

According to some embodiments of the present disclosure, operation 230 comprising setting the recording file on litigation-hold status when the LLS is above a preconfigured threshold for a preconfigured period of time.

According to some embodiments of the present disclosure, operation 240 comprising checking if there was access to the recording file after the preconfigured period of time has elapsed.

According to some embodiments of the present disclosure, operation 250 comprising releasing the recording file from litigation-hold status after the preconfigured period of time when there is no access to the recording file.

Figure 3:
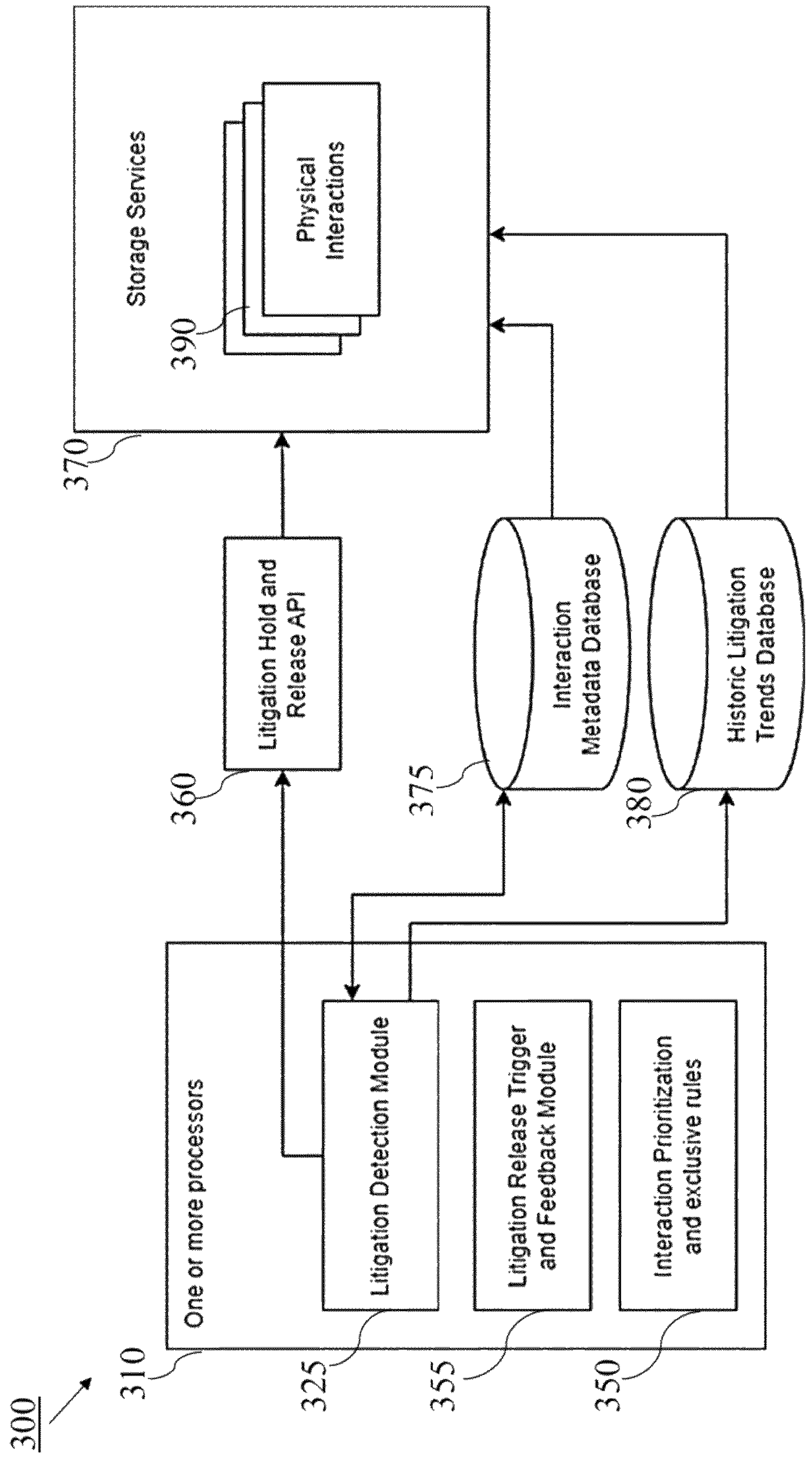
FIG. 3 is a high-level diagram of a system for detection and implementation of litigation-hold and release for interactions recordings within a contact center, in accordance with some embodiments of the present disclosure.

FIG. 3 is a high-level diagram of a system 300 for detection and implementation of litigation-hold and release for interactions recordings within a contact center, in accordance with some embodiments of the present disclosure.

According to some embodiments of the present disclosure, a system, such as system 300, may include the same components such as system 100A in FIG. 1A.

Figure 4:
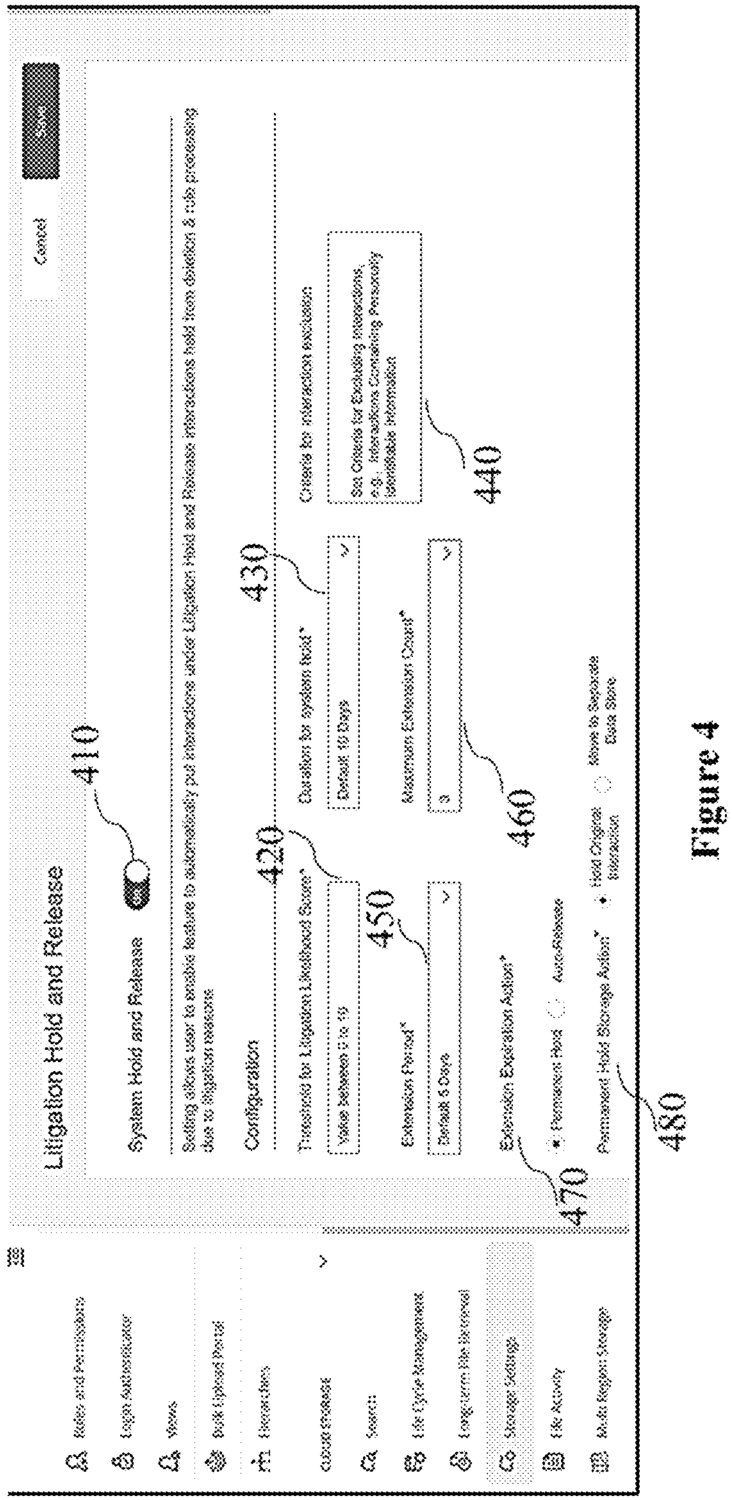
FIG. 4 is a screenshot of a User Interface (UI) of litigation hold and release, in accordance with some embodiments of the present disclosure.

According to some embodiments of the present disclosure, a GUI, such as GUI 400 in FIG. 4, may be used by users, e.g., legal team members, customer service agents, to interact with the system 300. System 300 may be implemented as a web application and may be used for tasks like reviewing interactions by accessing the related recording files and managing litigation processes.

According to some embodiments of the present disclosure, the one or more processors 310 may operate a module for detection and implementation of litigation-hold and release for interactions recordings within a contact center, such as litigation detection module 325, such as litigation detection module 125*b* in FIG. 1A and such as system 100A in FIG. 1A.

According to some embodiments of the present disclosure, the users, such as legal team members, customer service agents, may use web browsers or specific client applications to connect to the system's web server over the network by sending requests from their workstations via the web browsers or client applications. The network layer manages the flow of data between clients and the system's core components while ensuring security and load distribution. It also provides remote access capabilities.

According to some embodiments of the present disclosure, these requests may pass through the network layer i.e. router, firewall, load balancer to the application layer which includes a web server and an application server. The web server hosts the litigation management application and its APIs, e.g., litigation hold and release API 360. It serves web pages and handles user requests, such as viewing interactions, running reports, or submitting data. The application server processes the business logic of the litigation system. This includes computing the Litigation Likelihood Score (LLS) 185*a* in FIG. 1A, managing system holds, releases, and other core functionalities related to litigation processing.

According to some embodiments of the present disclosure, the application layer is responsible for executing the core functionalities of the litigation management system. It processes user requests, performs calculations, and manages interactions with the database by interacting with the data layer e.g., database server, storage server to retrieve or store data. Responses are sent back through the same path, ensuring that users receive the data or confirmation they need.

According to some embodiments of the present disclosure, the physical interactions 390, e.g., recording files of the interactions may be stored in storage services 370 may store all critical data, including interaction records, metadata, e.g., customer and agent details, litigation factors, and the status of system holds and releases, the interaction metadata database 375 and historic litigation trends database 380. The storage services 370 handles queries and transactions related to data retrieval and storage and provides space for storing backups, logs, archived interactions, and other large data sets. It ensures that data is safely stored and can be retrieved when needed and it is backed up regularly to prevent data loss.

According to some embodiments of the present disclosure, the system 300 may be secured by a firewall that blocks unauthorized access and potential threats. A Virtual Private Network (VPN) server may ensure that remote access is encrypted and secure. Encryption mechanisms protect sensitive data both at rest, in the database and storage servers and in transit over the network.

According to some embodiments of the present disclosure, the one or more processors may also operate a litigation release trigger and feedback module 355, such as litigation release trigger and feedback module 150*b* in FIG. 1B and interaction prioritization and exclusive rules module 350, such as interaction prioritization and exclusive rules module 150*b* in FIG. 1B.

According to some embodiments of the present disclosure, system 300 may be implemented in an automated compliance and data privacy management application to automatically place interactions having LLS above a preconfigured threshold on a litigation-hold status to prevent deletion or alteration, ensuring that all relevant data is preserved for potential legal proceedings as well as for data retention. The data retention policies may be adjusted based on litigation risk, e.g., LLS.

According to some embodiments of the present disclosure, the storage services 370 may be implemented in cloud storage. Interactions with LLS above the preconfigured threshold may be automatically set on hold-litigation status to ensure that they are preserved for legal review. The litigation-hold status may be extended when the interactions are accessed during the initial litigation-hold to provide additional review time, ensuring critical data remains protected as needed.

According to some embodiments of the present disclosure, interaction on litigation-hold status may be moved to permanent-hold status after a preconfigure number of consecutive extending of the preconfigured period of time, to ensure long-term retention of critical data in a secure environment.

According to some embodiments of the present disclosure, automated compliance checks may be operated on interaction which are on litigation-hold status to ensure regularity adherence. Thus, enhancing compliance and reducing the risk of penalties by ensuring interactions meet legal standards.

According to some embodiments of the present disclosure, reporting and audit trail generation may be operated to automatically generate reports and audit trails for interactions on litigation-hold status and released interactions. The reporting and audit trail may provide a transparent record for legal reviews and audits, ensuring traceability and compliance.

According to some embodiments of the present disclosure, interactions having LLS above a preconfigured threshold may be further routed to the legal or compliance teams for further review. This early detection of potential legal issues ensures that they are addressed before escalating, reducing the company's legal exposure. Automating the escalation process allows for faster response times and reduces the manual workload on teams.

According to some embodiments of the present disclosure, an application, such as Workforce Management (WFM) application may be configured to receive alerts as to agents that have above a preconfigured number of interactions during a specified time which are on litigation-hold status. Upon receiving the alerts, the WFM may be configured to automatically schedule training and performance reviews to the agents.

According to some embodiments of the present disclosure, an application, such as Quality Management (QM) application may automatically prioritize and mark interactions with LLS above a preconfigured threshold for manual review by quality assurance teams. The quality scores of interactions may be adjusted based on the related LLS, thus ensuring that high-risk interactions receive the necessary attention.

FIG. 4 is a screenshot of a User Interface (UI) 400 of litigation hold and release, in accordance with some embodiments of the present disclosure.

According to some embodiments of the present disclosure, GUI 400 may be used to configure the litigation-hold status and release feature, e.g., control element 410 in a system, such as system 100A in FIG. 1A, such as system 100B in FIG. 1B, and such as system 3 in FIG. 3.

According to some embodiments of the present disclosure, GUI 400 may enable users to set up and manage the automated process for holding and releasing interactions based on litigation risks. The configuration options ensure that high-risk interactions are preserved according to company policies and legal requirements, with flexible options for managing how and where these interactions are stored.

According to some embodiments of the present disclosure, a toggle, such as control element 410 may enable or disable the litigation hold and release feature which may be implemented by a system, such as system 100A in FIG. 1A and system 100B in FIG. 1B. When toggled "On" the system may automatically apply litigation-hold status, e.g., system hold to interactions that meet the defined criteria.

According to some embodiments of the present disclosure, the purpose of threshold for litigation likelihood score 420 may be to enable a user to define a threshold for the calculated Litigation Likelihood Score (LLS), which is a metric that determines the probability of an interaction leading to litigation, with the value ranging from '0' to '10', when control element 410 is "On". Interactions with an LLS above the specified threshold will automatically be placed under a system hold, e.g., litigation-hold status.

According to some embodiments of the present disclosure, the purpose of the drop-down list of duration for system hold options 430 is to define the initial duration for which an interaction will be held, when control element 410 is "On". The default duration in the example of GUI 400 is set to 10 days, but this can be adjusted as needed.

According to some embodiments of the present disclosure, the purpose of the criteria for interaction exclusion 440 is to enable users to set criteria for excluding certain interactions from being placed under a system hold, when control element 410 is "On". For example, interactions containing Personally Identifiable Information (PII) might be excluded to comply with data privacy regulations.

According to some embodiments of the present disclosure, the purpose of the drop-down list of criteria extension period options 450 is to enable the user to specify how long each system hold extension will last if the interaction is accessed during the hold period, when element 410 is "On". The default is set to 5 days, but this can be customized.

According to some embodiments of the present disclosure, the purpose of the drop-down list of maximum extension count 460 is to set the maximum number of times the system hold can be extended for a recording file of the interaction, when control element 410 is "On". For example, if set to 3, the hold can be extended three times before a final action is taken.

According to some embodiments of the present disclosure, the purpose of the 'extension expiration action' options 470 is to define the action to be taken once the maximum number of extensions has been reached. A permanent-hold may be implemented to the recording file of the interaction after the maximum extension count 460 has been exhausted, when the permanent hold is selected. When auto-release is selected the interaction may be automatically released from the litigation-hold status after all extensions expire, allowing the recording file to follow the associated data lifecycle process.

According to some embodiments of the present disclosure, the purpose of the 'permanent hold storage action' 480 is to specify where interactions placed under permanent hold should be stored. Either keep the recording file of the interaction in the original storage location when the 'hold original interaction' is selected or move to separate data store potentially more secure data store for long-term preservation when this option is selected.

Figure 5:
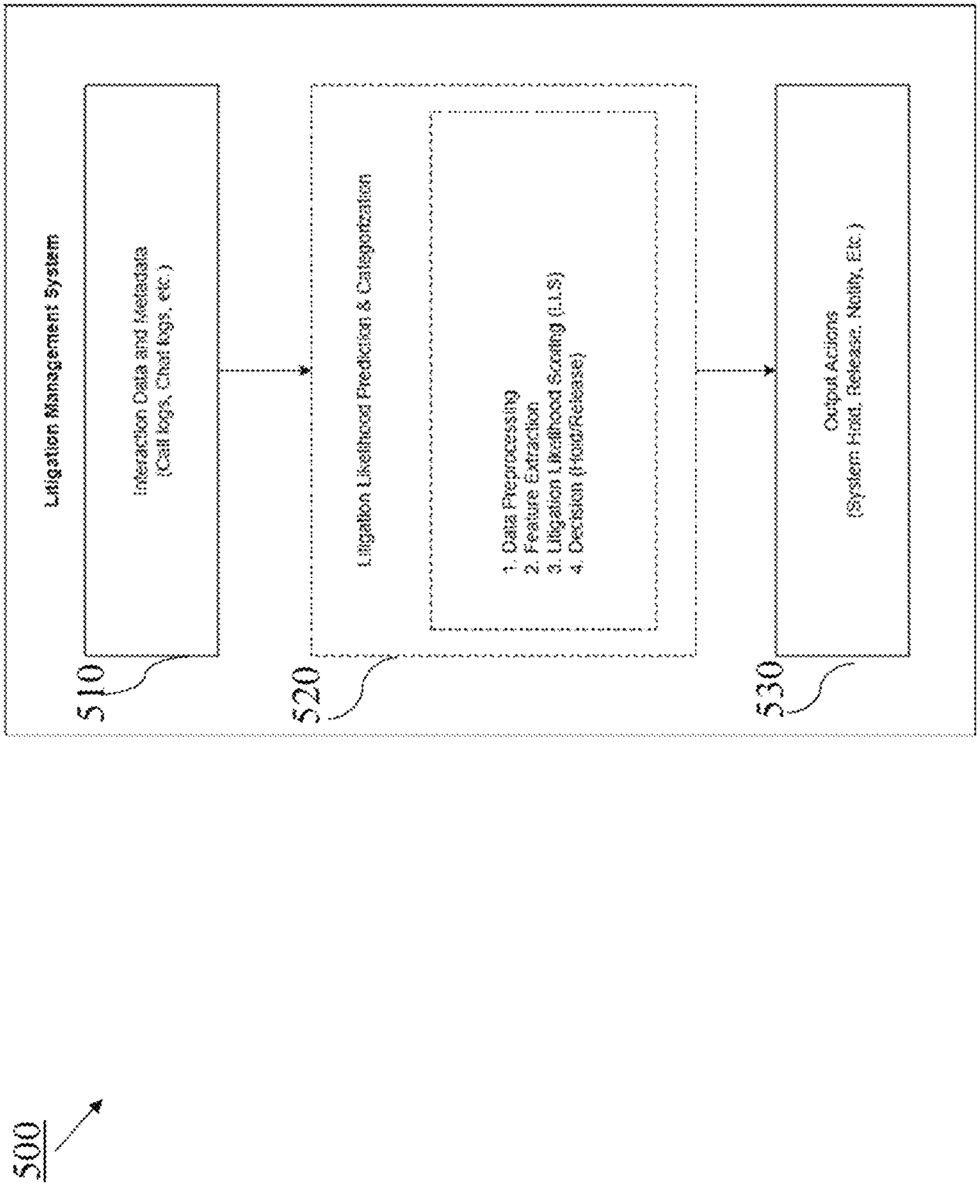
FIG. 5 is a diagram of a litigation management system, in accordance with some embodiments of the present disclosure.

FIG. 5 is a diagram of a litigation management system 500, in accordance with some embodiments of the present disclosure.

According to some embodiments of the present disclosure, litigation management system 500 may include all the components which are necessary to manage and process interactions and recording files of the interactions. The system 500 may collect input data used by the system, such as call logs, chat logs, and metadata related to customer and agent details. The collected data may be stored in a database, such as interactions database 175*a*, and such as interaction metadata database 175*b* in FIG. 1B and interaction metadata database 375 in FIG. 3.

According to some embodiments of the present disclosure, the collected data may be provided to a litigation likelihood prediction and categorization module 520, such as litigation detection system 125*b* in FIG. 1B and such as litigation detection module 325 in FIG. 3. The litigation likelihood prediction and categorization module 520 may be implemented as a Machine Learning (ML) model or Artificial Intelligence (AI) model.

According to some embodiments of the present disclosure, litigation likelihood prediction and categorization module 520 may include data processing of the interaction data and metadata 510 and then feature extraction of relevant features from the data. For example, interaction identifier, duration of interaction, participants involved in the interaction, communication channels, sentiment, intent the goal of interaction and compliance terms.

According to some embodiments of the present disclosure, the litigation likelihood prediction and categorization module 520 may calculate a Litigation Likelihood Scoring (LLS) for a recording file of the interaction based on the retrieved interaction metadata and interaction analysis.

Figure 7:
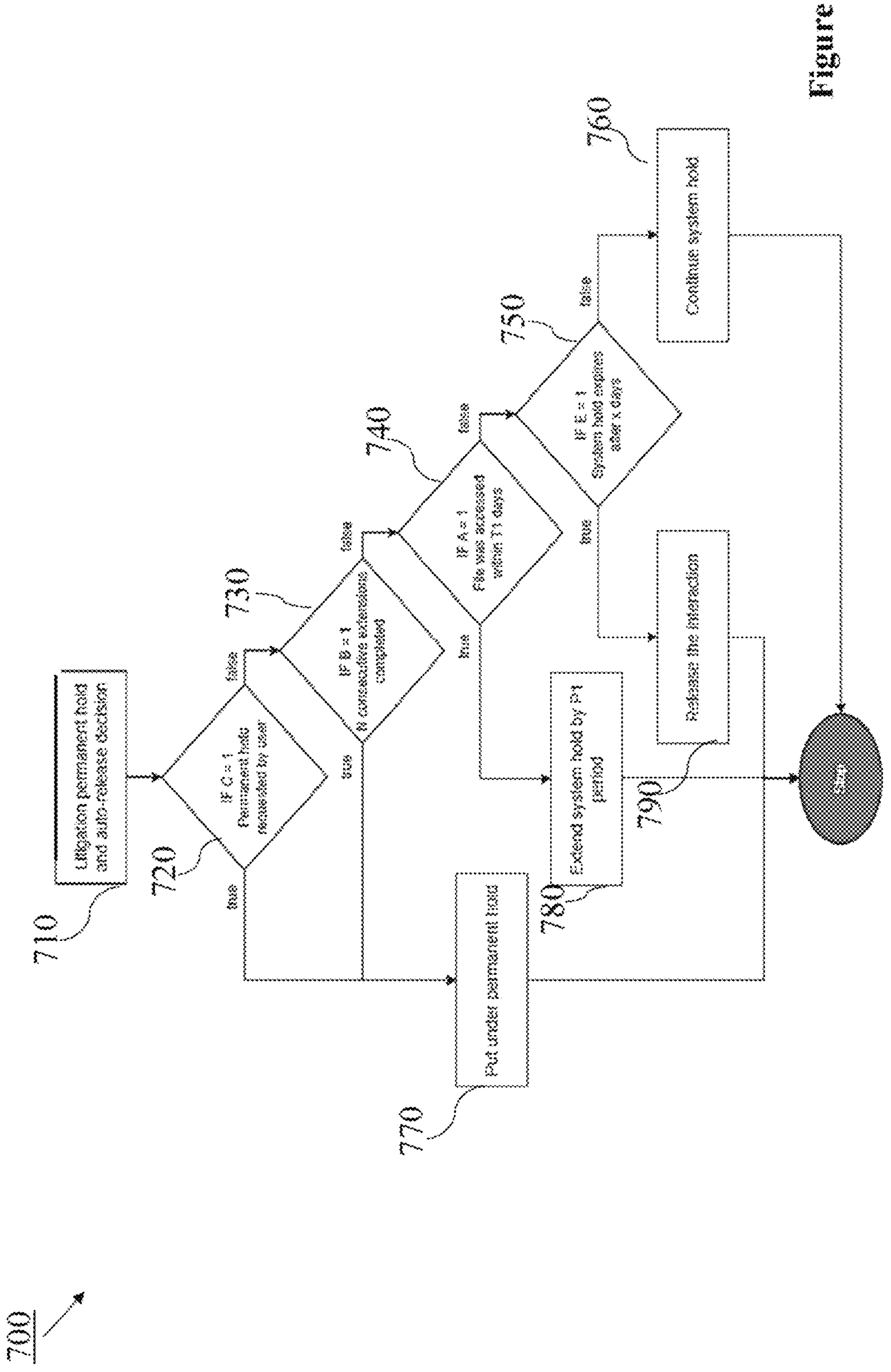
FIG. 7 is a high-level workflow of permanent hold and auto-release decision, in accordance with some embodiments of the present disclosure.

According to some embodiments of the present disclosure, based on the LLS and a preconfigured threshold, the litigation likelihood prediction and categorization module 520 may decide whether to place the interaction on litigation-hold status, release it, or escalate it, as shown in FIG. 7

According to some embodiments of the present disclosure, the system 500 may operate the actions based on the litigation likelihood prediction and categorization module 520 decisions. For example, placing an interaction under system hold, e.g., on litigation-hold status, notifying the legal team, or escalating high-risk interactions for further review. Automatic notifications may be triggered to supervisors or legal teams for further review when thresholds are breached, or interactions require escalation.

Figure 6:
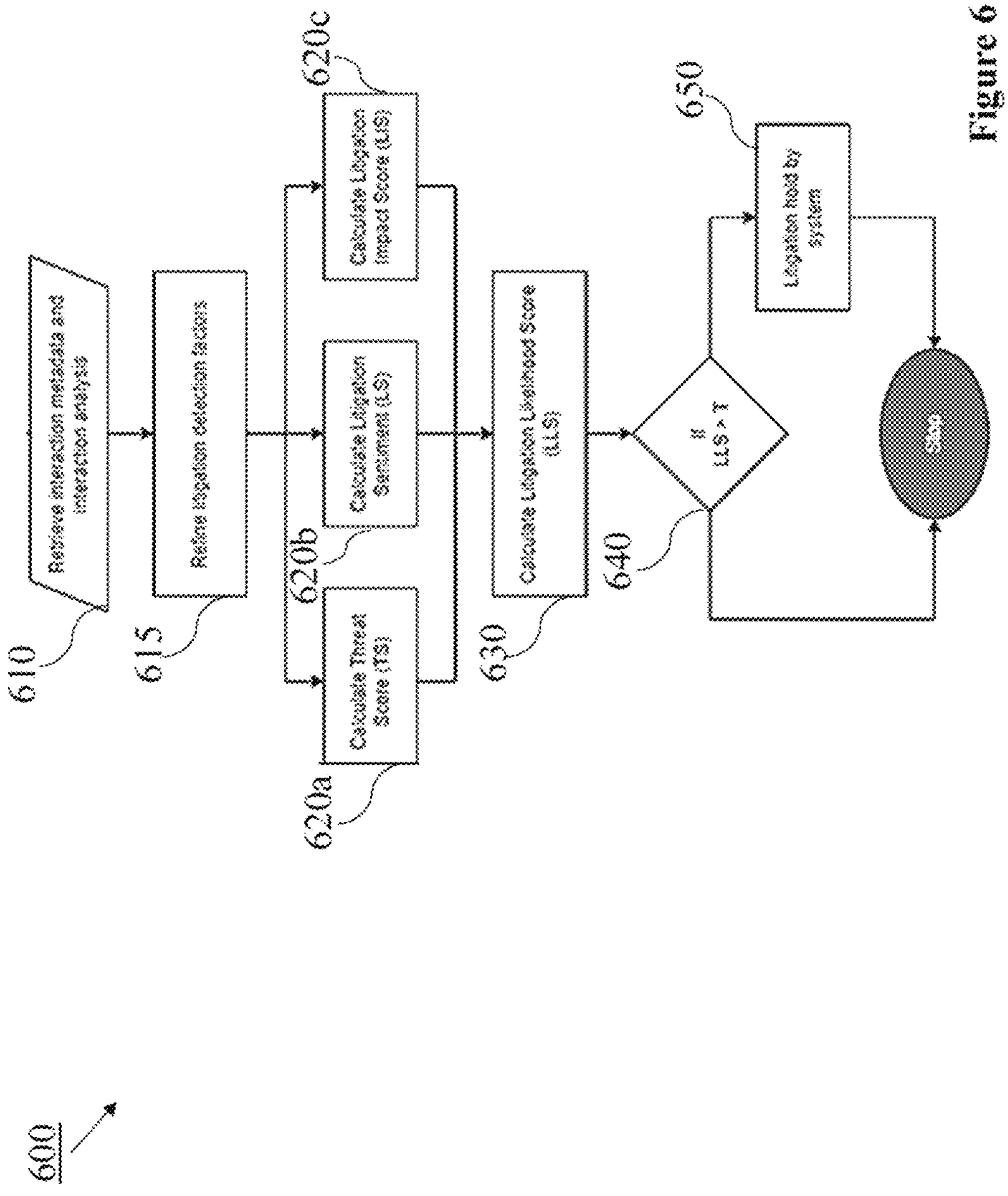
FIG. 6 is a high-level workflow of litigation likelihood score calculation, in accordance with some embodiments of the present disclosure.

FIG. 6 is a high-level workflow 600 of litigation likelihood score calculation, in accordance with some embodiments of the present disclosure.

According to some embodiments of the present disclosure, a system, such as system 100A in FIG. 1A may operate the LLS calculation by initially retrieving interaction metadata and interaction analysis 610. Then, refine litigation detection factors 615 to calculate Threat Score 620*a*, Litigation Sentiment (LS) 620*b* and Litigation Impact Score (LIS) 620*c*.

According to some embodiments of the present disclosure, the TS 620*a* may be calculated according to formula II:

$$TS = w\_1 \times (\text{Explicitness score}) + w\_2 \times (\text{Credibility Score}) + w\_3 \times (\text{Compliance score}) + w\_4 \times (\text{Historic Litigation Likelihood Score } (HLLS)), \quad \text{(II)}$$

whereby:
w_1-w_4 are preconfigured weights, $$\text{Explicitness Score} = (\text{number of explicit terms mentioned})/(\text{total number of terms}),$$

$$\text{Credibility Score} = \sum_{i=1}^{n} (\text{ frequency of credibility term}(i) \times W(i))$$

whereby:
W(i) is a weight assigned to a credibility term (i), $$\text{Compliance Score} = \sum_{j=1}^{m} (\text{ compliance factors}(j) \times W(j)),$$

and
W(j) is a weight assigned to a compliance factor (j), and $$HLLS = \text{total number of similar interactions}/\text{number of past litigations with similar context}.$$

According to some embodiments of the present disclosure, the LS 620*b* may be calculated according to formula III:

$$LS = w\_5 \times (\text{emotional sentiment}) + w\_6 \times (\text{negative sentiment}) + w\_7 \times (\text{perceived intent}) + w\_8 \times (\text{risk aversion}),$$

whereby:
w_5-w_8 are preconfigured weights, $$\text{emotional sentiment} = \sum_{k=1}^{l} (\text{frequency of emotion term}(k) \times W(k))$$

$$\text{negative sentiment} = \frac{\sum_{l=1}^{p} (\text{frequency of negative term}(l) \times W(l))}{\text{total number of terms in interaction}}$$

$$\text{perceived intent} = \sum_{r=1}^{q} (\text{Intent Indicator}(r) \times W(r)), \text{ and}$$

$$\text{risk aversion} = \frac{\text{number of past legal disputes}}{\text{total number of interactions}},$$

whereby:
number of past legal disputes is a number of disputes during the preconfigured period, and total number of interactions is a number of interactions where customer was involved.

According to some embodiments of the present disclosure, the LIS 620*c* may be calculated based on formula (IV):

$$LIS = w\_9 \times (\text{interaction value}) + w\_10 \times (\text{potential loss probability}) + w\_11 \times (\text{impact score}) + w\_12 \times (\text{timeline of an issue related to the recording file of the interaction}), \quad \text{(IV)}$$

whereby:
w_9-w_12 are preconfigured weights, $$\text{Interaction Value} = \sum_{t=1}^{k} (\text{high value attribute}(t) \times W(t))$$

whereby:
high-value attribute (t) is a binary value, '1' if the attribute is present, '0' if not,
Wt is the weight assigned to high-value attribute (t) based on its importance, and
k is a number of different high-value attributes considered, $$\text{Potential Loss Probability} = \sum_{i=1}^{n} (\text{ loss indicator}(i) \times W(i))$$

$$\text{impact score} = \text{severity of impact} \times \text{probability of litigation}$$

whereby:
severity of impact is a weighted value based on a parameter of potential consequences of litigation, and
probability of litigation is a parameter that is derived from other factors, $$\text{timeline of an issue related to the recording file of the interaction} = \log(\text{duration of the issue in days} + 1),$$

whereby:
duration of the issue in days is a period of time since the issue raised by the customer in the interaction.

According to some embodiments of the present disclosure, the LLS 630 may be calculated based on TS 620*a*, LS 620*b* and LIS 620*c* according to formula I:

$$LLS = \sqrt[3]{ThreatScore\ (TS) \times LitigationSentiment\ (LS) \times LitigationImpactScore\ (LIS)}$$

According to some embodiments of the present disclosure, when the LLS may be above a preconfigured threshold 640 the system may put the recording file of the interaction on litigation-hold status 650.

FIG. 7 is a high-level workflow 700 of permanent hold and auto-release decision, in accordance with some embodiments of the present disclosure.

According to some embodiments of the present disclosure, a system, such as system 100B in FIG. 1B and such as system 300 in FIG. 3 may extend the preconfigured period of time of the litigation-hold status when the recording file of the interaction has been accessed and then after a preconfigured number of consecutive extending of the preconfigured period of time, the system may automatically set the recording file on permanent-hold.

According to some embodiments of the present disclosure, once a recording file is put under litigation-hold status, there are several possible scenario. One possible scenario is if the file is accessed within the specified duration T1, the system, such as system 1A in FIG. 1A and system 100B in FIG. 1B, can extend the litigation-hold. After a set number of consecutive extensions of the litigation-hold status, the recording file of the interaction may shift to a permanent litigation-hold status, which is disabling automatic release.

According to some embodiments of the present disclosure, the litigation permanent-hold and auto-release decision 710 may be operated by checking if a permanent-hold has been requested by user 720, for example via a GUI, such as GUI 400 in FIG. 4.

According to some embodiments of the present disclosure, when there is such a request to put on permanent-hold, the recording file is set under permanent-hold 770 and may be released only by an active request. In case, there is no such request from a user, checking if a preconfigure number of consecutive extending of the preconfigured period of time 730 has been operated. In case the preconfigure number of consecutive extending of the preconfigured period of time has been operated, the recording file is set under permanent-hold 770.

According to some embodiments of the present disclosure, when a preconfigure number of consecutive extending of the preconfigured period of time hasn't been operated, checking if the recording file has been accessed within T1 days, e.g. preconfigured period of time 740.

According to some embodiments of the present disclosure, when the recording file has been accessed within the preconfigured period of time, extending the litigation-hold status by $P^1$ period 780. When the recording file has not been accessed within the preconfigured period of time then checking if the preconfigured of time has elapsed and the litigation-hold status may expire after x days 750, if so, release the interaction 790, by automatically releasing the recording file of the interaction from litigation-hold states and otherwise the litigation-hold status of the recording file may continue 760.

Figure 8:
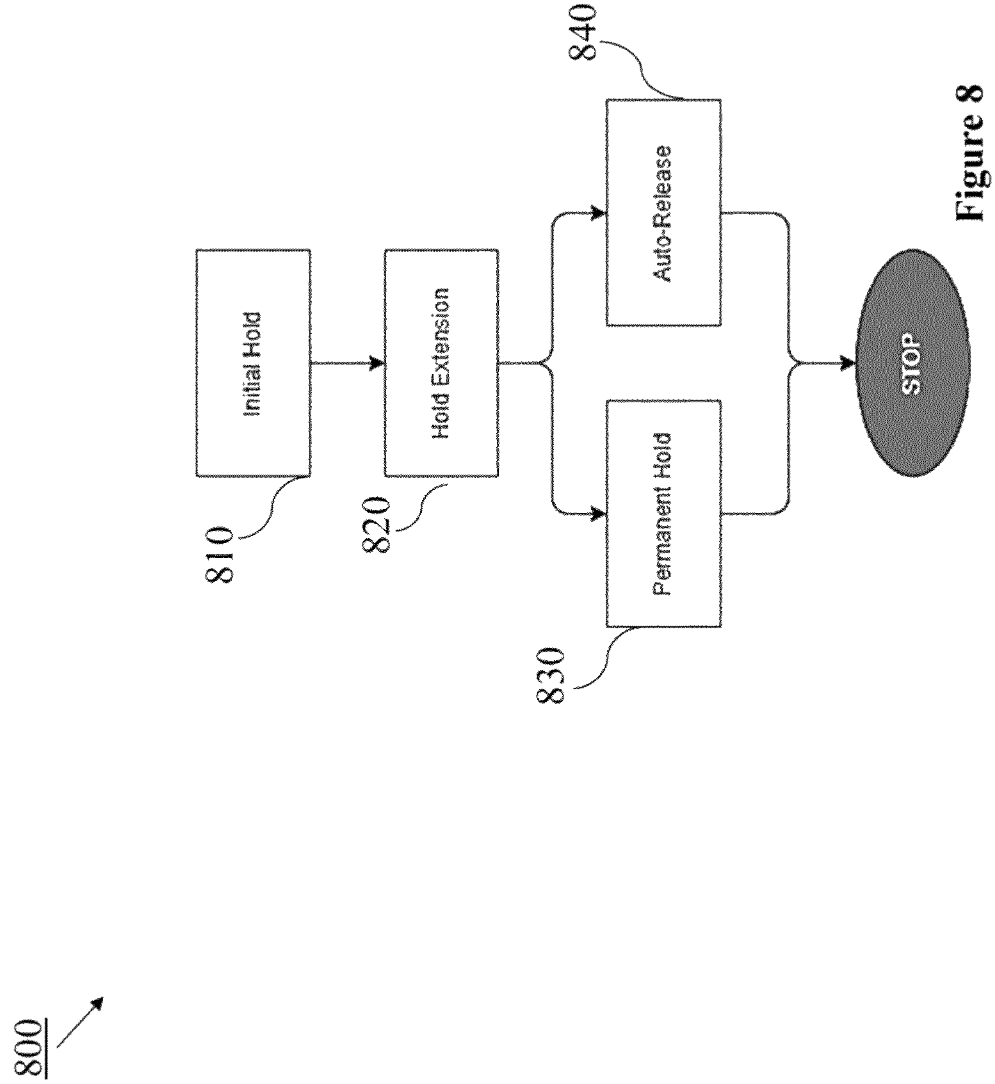
FIG. 8 is a high-level workflow of system hold lifecycle, in accordance with some embodiments of the present disclosure.

FIG. 8 is a high-level workflow of system hold lifecycle 800, in accordance with some embodiments of the present disclosure.

According to some embodiments of the present disclosure, a system hold, e.g. hold-litigation status is a state applied to an interaction or recording file within a contact center or customer service system to preserve and protect it from any alterations, deletions, or lifecycle processes. This hold status is typically enforced to ensure that the recording files related to the interaction remain intact and available for legal, compliance, or regulatory review.

According to some embodiments of the present disclosure, the primary purpose of a system hold is to safeguard interactions that are identified as high risk for litigation or other legal actions. By placing a recording file under system hold, the organization ensures that the relevant data is preserved in its original form, which is crucial for potential legal proceedings.

According to some embodiments of the present disclosure, in a system such as system 100A in FIG. 1A, system 100B in FIG. 1B and system 3 in FIG. 3 in the initial hold 810 the recording file of the interaction may be placed under system hold, e.g., litigation-hold status, based on the calculated LLS.

According to some embodiments of the present disclosure, when the recording file has been accessed within the preconfigured period of time, a hold extension 820 may be operated by extending the litigation-hold status of the recording file in an additional preconfigured period of time.

According to some embodiments of the present disclosure, the recording file may be put on permanent-hold 830 after a preconfigured number of consecutive extensions or upon user request via a GUI, such as GUI 400 in FIG. 4 and disabling of auto-release option.

According to some embodiments of the present disclosure, when the recording file of the interaction hasn't been accessed during the preconfigured period of time or no further litigation-hold requests are made via the GUI, then the litigation-hold status may be automatically released, and the recording file may be returned to the data lifecycle processes.

Figure 9:
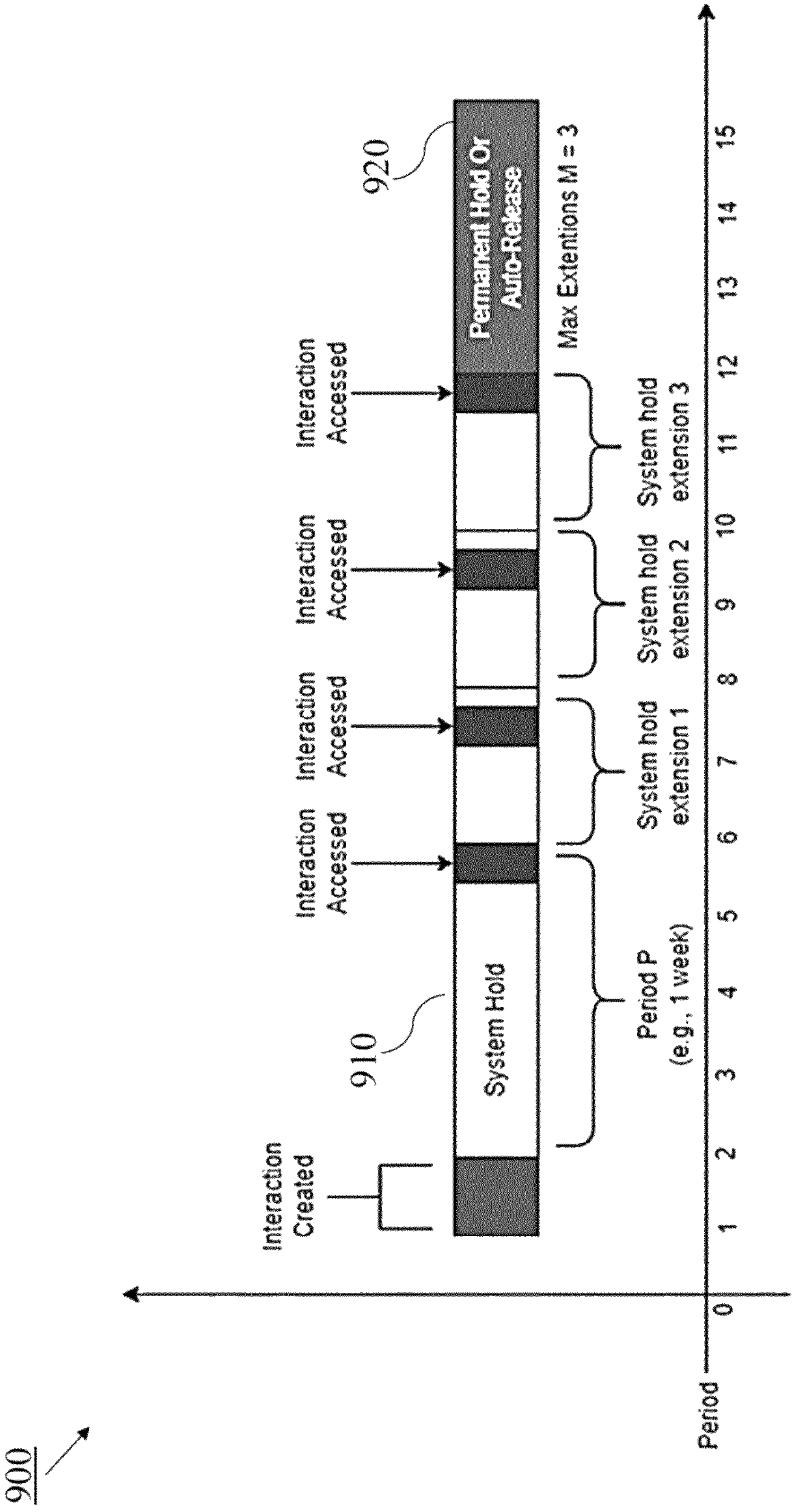
FIG. 9 is an example of a sequence diagram of system hold and release with extensions, in accordance with some embodiments of the present disclosure.

FIG. 9 is an example 900 of a sequence diagram of system hold and release with extensions, in accordance with some embodiments of the present disclosure.

According to some embodiments of the present disclosure, in a system, such as system 100A in FIG. 1A, system 100B in FIG. 1B and system 3 in FIG. 3, recording files of critical interactions, that may be related to litigation issues, may be preserved when needed and automatically released when they no longer pose a risk, thus balancing legal compliance with operational efficiency.

According to some embodiments of the present disclosure, in example 900, after a recording file of an interaction is created, when its calculated LLS is above a preconfigured threshold, it may be put on system hold 910, e.g., litigation-hold status, for a preconfigured period of time, for example, one week. After each preconfigured period of time has elapsed and the interaction has been accessed the preconfigured period of time may be extended.

According to some embodiments of the present disclosure, after a preconfigured number of consecutive extending of the preconfigured period of time, the recording file of the interaction may be set on permanent-hold or when the number of consecutive extending is less than the preconfigured number of consecutive extending of the preconfigured period of time, the recording file may be automatically released 920.

Figure 10:
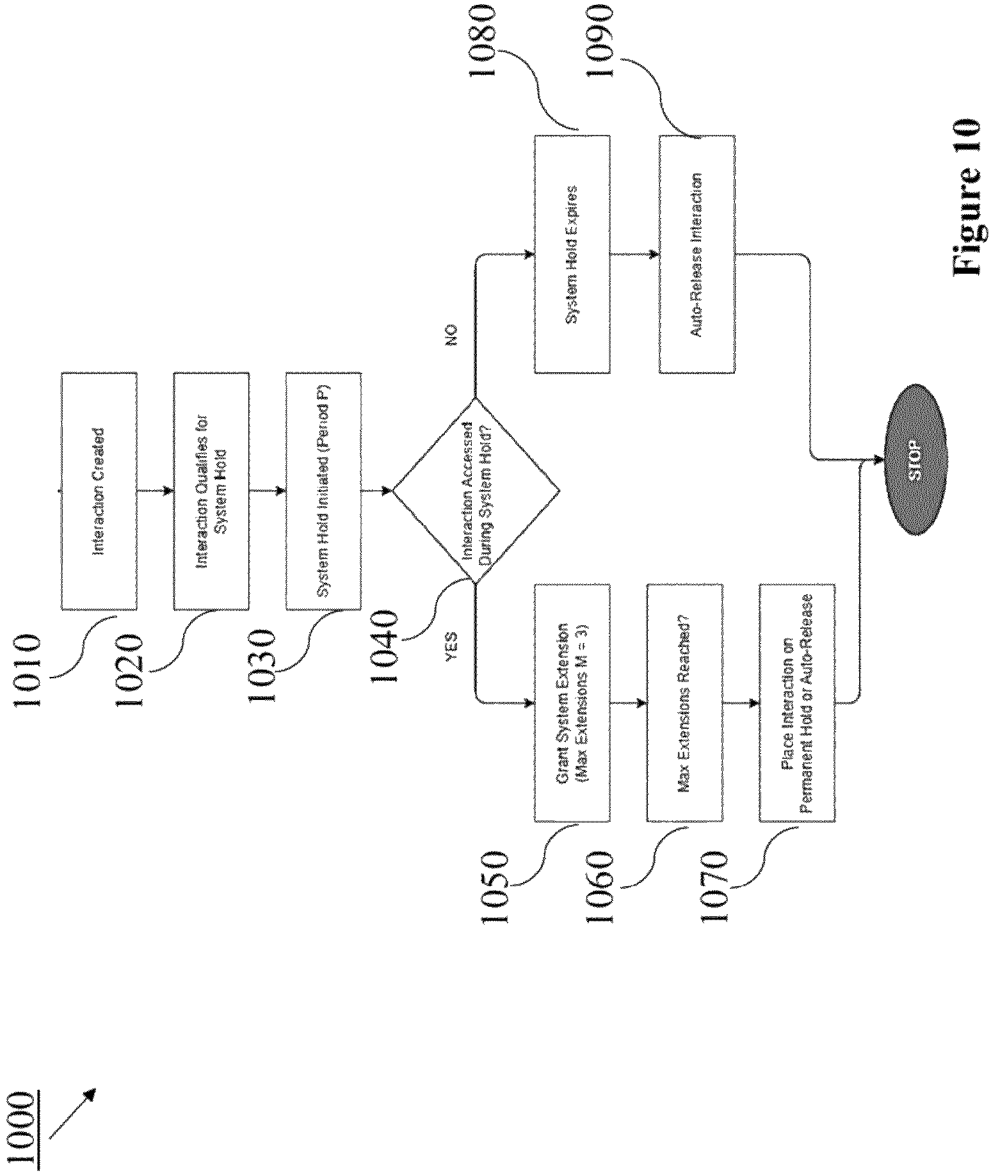
FIG. 10 is a high-level workflow of system hold and release with extensions, in accordance with some embodiments of the present disclosure.

FIG. 10 is a high-level workflow 1000 of system hold and release with extensions, in accordance with some embodiments of the present disclosure.

According to some embodiments of the present disclosure, example 900 in FIG. 9 may include the following operations.

According to some embodiments of the present disclosure, an interaction, such as customer call, chat or email may be created 1010. Based on predefined criteria, e.g., litigation risk, LLS above T, this interaction may be qualified for a system hold.

According to some embodiments of the present disclosure, when the interaction is qualified for system hold 1020 a system hold for the recording file of the interaction may be initiated 1030 for period P, e.g., one week.

According to some embodiments of the present disclosure, checking if the interaction has been accessed during system hold 1040, when there was no access, the system hold expires 1080 and an automatic release of the recording file that is related to the interaction 1090 may be operated.

According to some embodiments of the present disclosure, during period P, the interaction has been accessed. As a result, the litigation-hold status extension may be granted by extending the hold period of time for an additional timeframe. Later on, the recording file of the interaction has been accessed two more times leading to the granting of two more hold extensions. Each time, the system hold may be extended by a similar duration as the first extension or a different duration According to some embodiments of the present disclosure, when maximum number of extensions has reached 1060, e.g., three times, the recording file of the interaction may be placed on permanent-hold 1070, thus ensuring that the recording file of the interaction is preserved indefinitely for legal or compliance purposes.

According to some embodiments of the present disclosure, optionally, if the interaction is not accessed again during the preconfigured period of time after the final extension, e.g., extension 3, the recording file of the interaction may be automatically released from the litigation-hold status.

According to some embodiments of the present disclosure, the outcome depends on the system's configuration, which could either permanently retain the interaction or release it after all hold extensions have been exhausted and no further access occurs.

Figure 11:
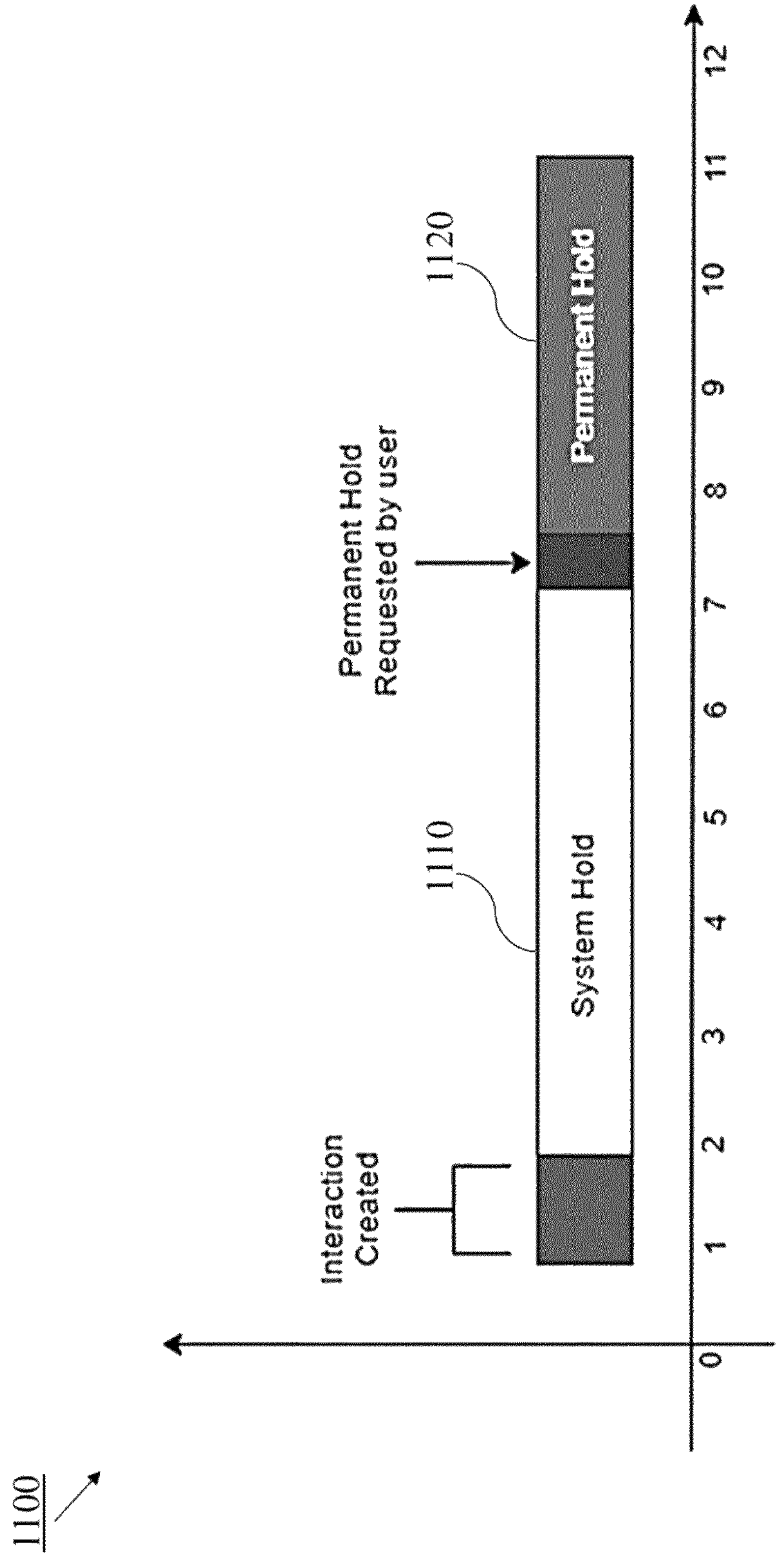
FIG. 11 is an example of permanent hold by user, in accordance with some embodiments of the present disclosure.

FIG. 11 is an example 1100 of permanent hold by user, in accordance with some embodiments of the present disclosure.

According to some embodiments of the present disclosure, in a system, such as system 100A in FIG. 1A, system 100B in FIG. 1B and system 3 in FIG. 3, recording files of critical interactions, that may be related to litigation issues, may be put on litigation-hold status, e.g. system hold 1110 and then a user may request a permanent-hold 1120 via a GUI, such as GUI 400 in FIG. 4.

According to some embodiments of the present disclosure, this manual intervention where a user decides that an interaction should be preserved indefinitely, allowing to manage data with a higher degree of control in response to specific legal or compliance needs.

Figure 12:
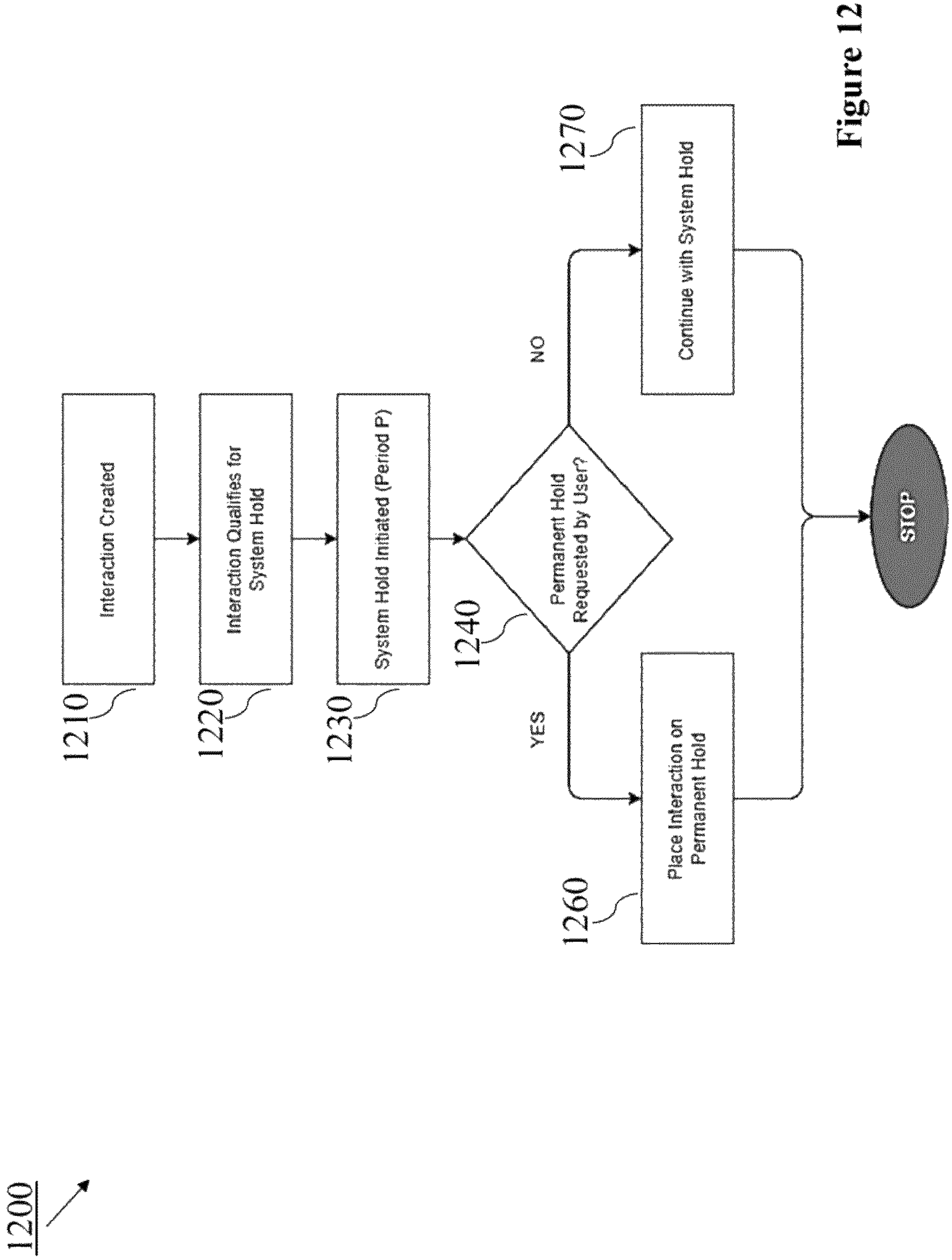
FIG. 12 is a high-level workflow of a permanent hold request by user, in accordance with some embodiments of the present disclosure.

FIG. 12 is a high-level workflow 1200 of a permanent hold request by user, in accordance with some embodiments of the present disclosure.

According to some embodiments of the present disclosure, example 1100 in FIG. 11 may include the following operations.

According to some embodiments of the present disclosure, an interaction, such as customer call, chat or email may be created 1210. Based on predefined criteria, e.g., litigation risk, LLS above T, this interaction may be qualified for a system hold 1220.

The interaction qualifies for a system hold based on predefined criteria, such as potential litigation risk or compliance needs.

According to some embodiments of the present disclosure, initially, the recording file of the interaction may be placed under a system hold, litigation-hold status 1230. During this period, the interaction is preserved, and deletion or modification is prevented.

According to some embodiments of the present disclosure, checking if there is a request from a user for permanent-hold 1240, as at a certain point, e.g., point 7 in example 1100 in FIG. 11, a user may manually request that the interaction be placed under a permanent hold via a GUI, such as GUI 400 in FIG. 4. This could be due to evolving legal concerns, ongoing litigation, or other business requirements. The checking may be operated at the end of the preconfigured period of time of the litigation-hold status.

According to some embodiments of the present disclosure, following the user's request, the interaction is moved from a system-hold, e.g., litigation-hold status to a permanent-hold 1260. Once in this state, the recording file of the interaction is preserved indefinitely, ensuring it remains available for legal or compliance purposes.

According to some embodiments of the present disclosure, the litigation-hold status initially protects the recording file of the interaction from deletion or modification, ensuring it is available for review or legal processes. The manual action by the user of request for permanent-hold via the GUI transitions the recording file of the interaction into a state where it is preserved permanently, safeguarding it against all future deletions or lifecycle management rules. Thus, the interaction remains under permanent hold, ensuring that it is securely retained for as long as necessary.

Figure 13:
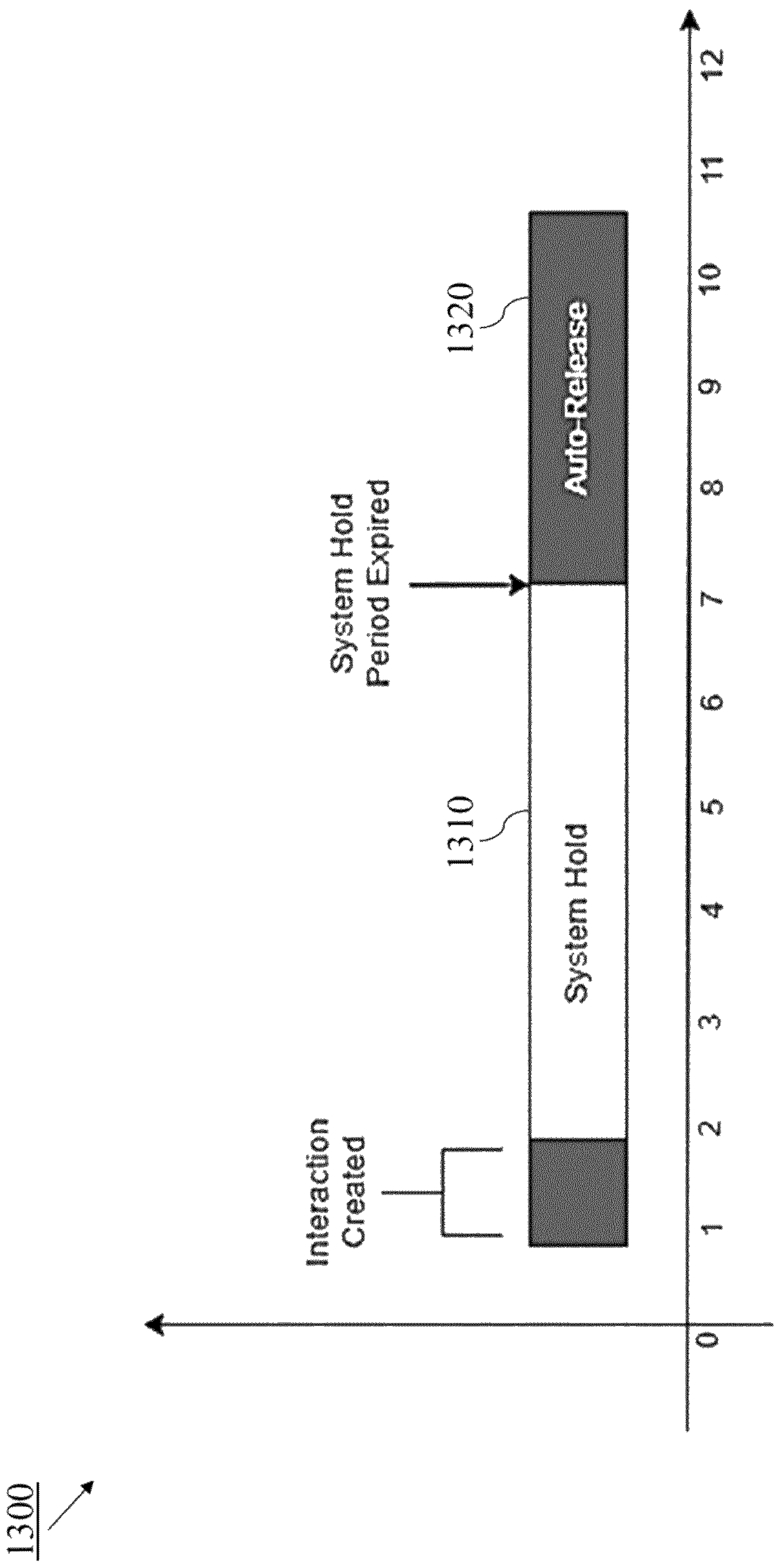
FIG. 13 is an example of auto release after completing system hold, in accordance with some embodiments of the present disclosure.

FIG. 13 is an example 1300 of auto release after completing system hold, in accordance with some embodiments of the present disclosure.

According to some embodiments of the present disclosure, in a system, such as system 100A in FIG. 1A, system 100B in FIG. 1B and system 3 in FIG. 3, recording files of critical interactions, that may be related to litigation issues, may be put on litigation-hold status, e.g. system hold 1310.

According to some embodiments of the present disclosure, when the user didn't request permanent-hold then after the preconfigured period of time, if the recording file has been accessed then the litigation-hold status is extended and otherwise the recording file may be released from litigation-hold status.

Figure 14:
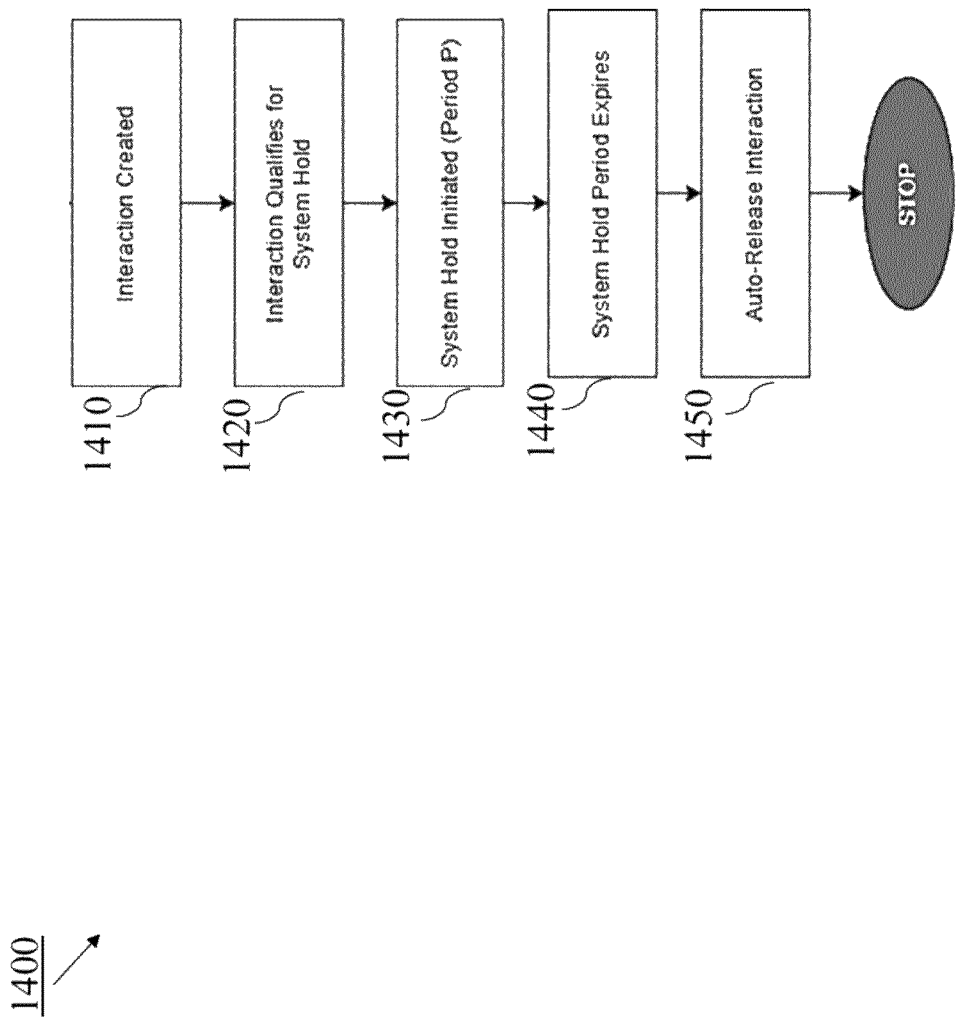
FIG. 14 is a high-level workflow of system hold, in accordance with some embodiments of the present disclosure.

FIG. 14 is a high-level workflow 1400 of system hold, in accordance with some embodiments of the present disclosure.

According to some embodiments of the present disclosure, example 1300 in FIG. 13 may include the following operations.

According to some embodiments of the present disclosure, an interaction, such as customer call, chat or email may be created 1410. Based on predefined criteria, e.g., litigation risk, LLS above T, this interaction may be qualified for a system hold 1420.

The interaction may be identified as requiring preservation and therefore qualifies for a system hold based on predefined criteria, such as potential litigation risk or compliance needs.

According to some embodiments of the present disclosure, the interaction may be placed under system hold, e.g., litigation-hold status for a preconfigured period of time. During this time, the interaction is protected from deletion or modification, ensuring it is available for any legal or compliance reviews 1430.

According to some embodiments of the present disclosure, after the preconfigured period of time, period P elapsed 1440, e.g., in period 7 in FIG. 13, a system, such as system 100A in FIG. 1A may check whether the recording file of the interaction needs to remain under hold or can be released.

According to some embodiments of the present disclosure, when no further actions, such as automatic extensions or permanent-hod request have been taken the recording file of the interaction may be automatically released from the system hold 1450. Once the recording file of the interaction has been released, the interaction may follow the standard data retention policies, which could involve deletion or archival.

According to some embodiments of the present disclosure, the system-hold, e.g., litigation-hold status may temporarily preserve interactions to prevent any actions that might compromise data integrity or availability during the hold system period. Once the hold period expires and no further actions are taken, the system, such as system 100A in FIG. 1A, may automatically release the interaction, allowing it to follow its standard lifecycle. As a result, the recording file of the interaction may be removed from the litigation-hold status and may be subject to the normal data management processes within the organization.

According to some embodiments of the present disclosure, this flow of operations 1400, shown in example 1300 in FIG. 13 illustrates the automated lifecycle management capabilities of the system, such as system 100A in FIG. 1A ensuring that interactions are preserved, when necessary, but also released efficiently when they no longer require special handling, balancing legal compliance with operational efficiency.

Figure 15:
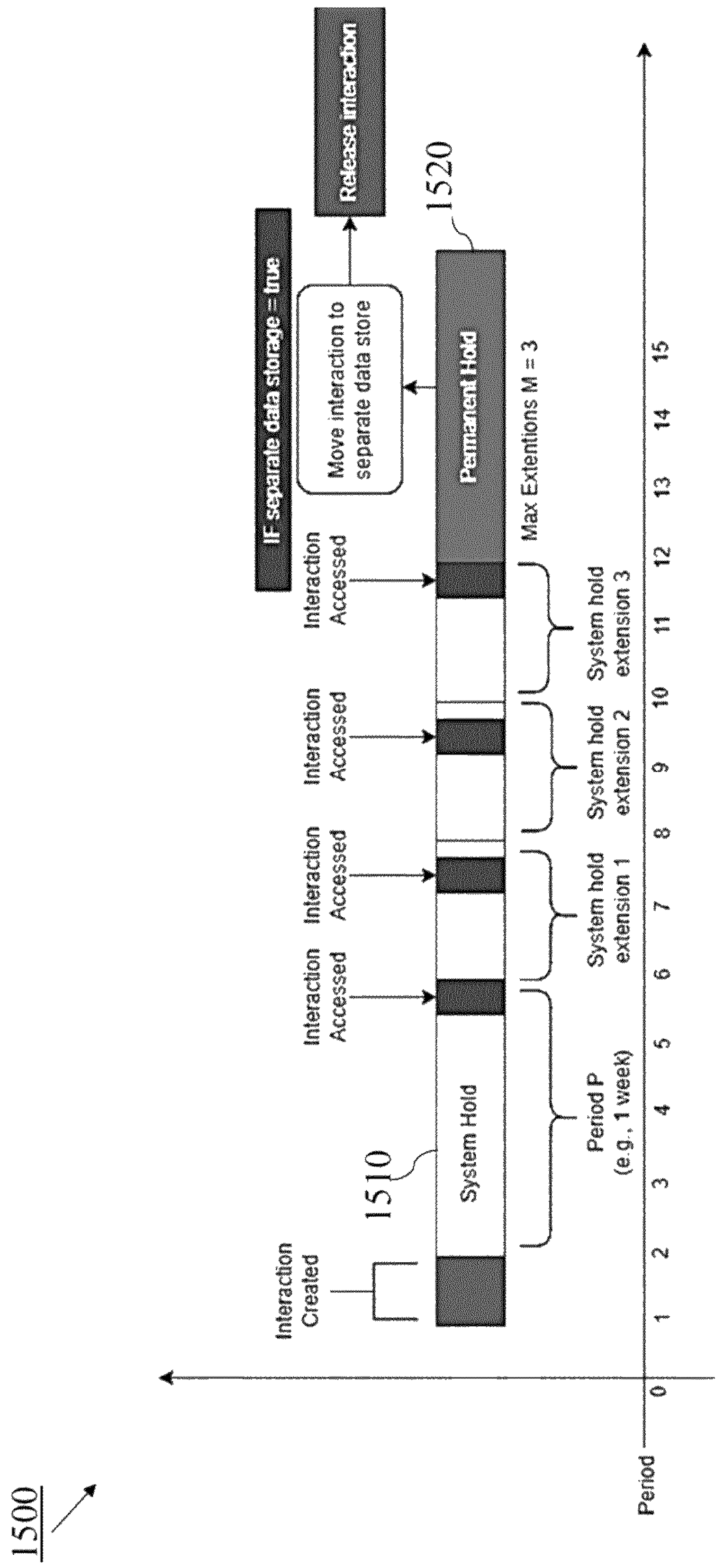
FIG. 15 is an example of system hold and release with separate data stores, in accordance with some embodiments of the present disclosure.

FIG. 15 is an example 1500 of system hold and release with separate data store, in accordance with some embodiments of the present disclosure.

According to some embodiments of the present disclosure, in a system, such as system 100A in FIG. 1A, system 100B in FIG. 1B and system 300 in FIG. 3, recording files of critical interactions that may be related to litigation issues may be put on litigation-hold status, e.g. system hold 1510. The recording file of the interaction may be put on litigation-hold status for a preconfigured period of time, e.g., one week, and then access to the interaction during the preconfigured period of time may be checked, after the preconfigured period of time has elapsed. The litigation-hold status may be extended for a preconfigured number of times after which the recording file may be put on permanent-hold, as shown in FIG. 9.

According to some embodiments of the present disclosure, this example 1500 demonstrates a data management process where interactions can be securely stored in a separate environment after exhausting all possible hold extensions, providing an additional layer of data protection and flexibility in managing long-term retention and release policies.

Figure 16:
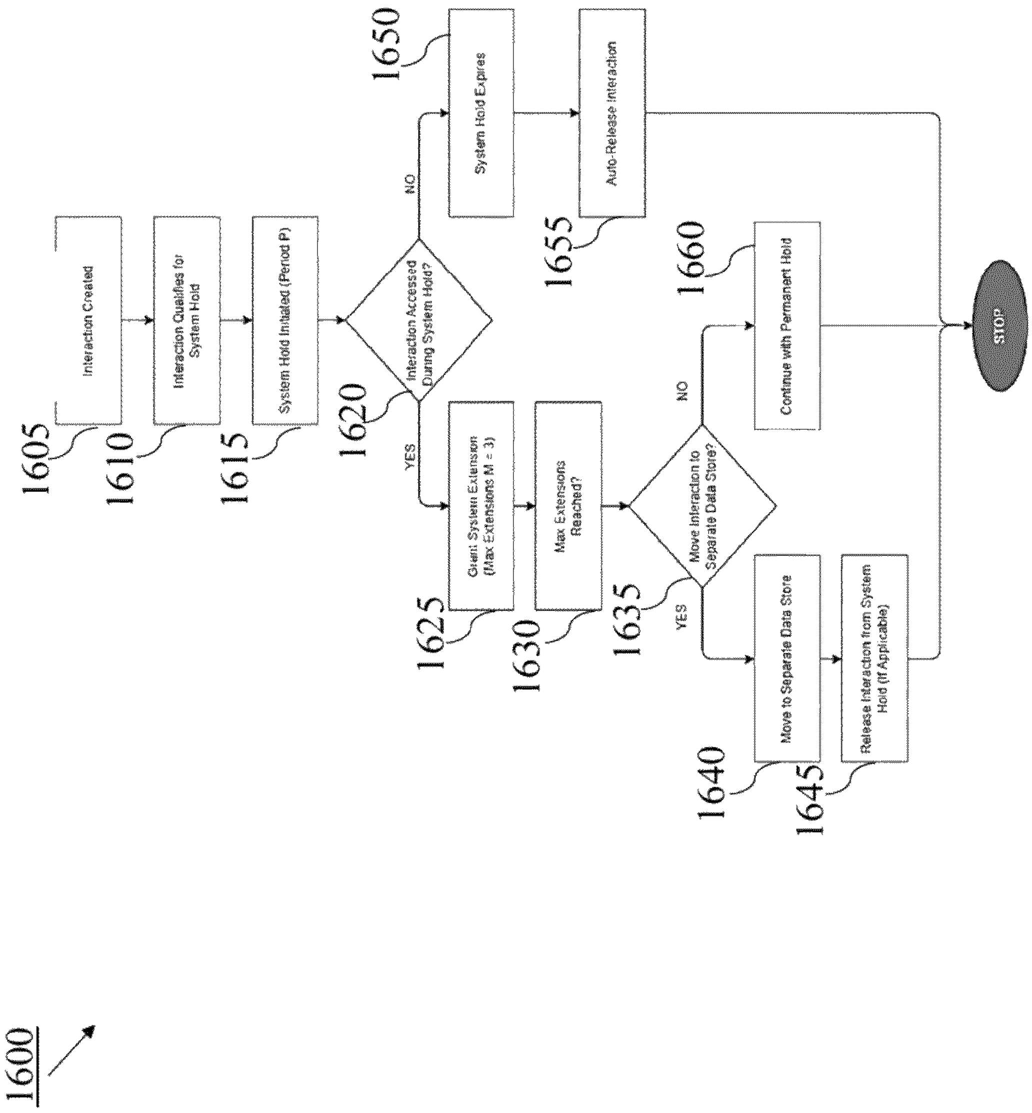
FIG. 16 is a high-level workflow of detection and implementation of litigation-hold and release for interactions recordings within a contact center, in accordance with some embodiments of the present disclosure.

FIG. 16 is a high-level workflow 1600 of detection and implementation of litigation-hold and release for interactions recordings within a contact center, in accordance with some embodiments of the present disclosure.

According to some embodiments of the present disclosure, example 1500 in FIG. 15 may include the following operations.

According to some embodiments of the present disclosure, an interaction, such as customer call, chat or email may be created 1605. Based on predefined criteria, e.g., litigation risk, LLS above T, this interaction may be qualified for a system hold 1610. The interaction may be identified as requiring preservation and therefore qualifies for a system hold based on predefined criteria, such as potential litigation risk or compliance needs.

According to some embodiments of the present disclosure, initially, the recording file of the interaction may be placed under a system hold for a predefined period P 1615, e.g., one week. During this period, the interaction is protected from deletion or any modifications, ensuring it is available for review or legal purposes.

According to some embodiments of the present disclosure, a system, such as system 100B in FIG. 1B may check if the interaction has been accessed during the preconfigured period of time that the recording file was under system hold 1620.

According to some embodiments of the present disclosure, in example 1500, the recording file of the interaction is accessed at multiple intervals. Each time it is accessed, the system grants a hold extension, when the preconfigured period of time has elapsed, which prolongs the hold period. This can happen up to a preconfigured number of times, for example, maximum of three times.

According to some embodiments of the present disclosure, checking if the interaction has been accessed during the preconfigured time of litigation-hold status 1620 and if so, checking the number of extensions 1625 and if maximum extensions has been reached 1630 and checking if to move the interaction to a separate data store 1635. The decision to send an interaction to a separate data store depends on a flag. If the toggle for enabling this action when an interaction qualifies for litigation hold is active, it will be sent, otherwise, it will not.

According to some embodiments of the present disclosure, the interaction may be moved to the separate data store by using cloud storage data transfer Application Programming Interface (API) s which can be leveraged to move the qualified interaction to the separate data store. This is a scenario where interactions can be securely stored in a separate environment after exhausting all possible hold extensions, providing an additional layer of data protection and flexibility in managing long-term retention and release policies.

According to some embodiments of the present disclosure, when the interaction is not moved to separate data store, the decision to send an interaction to a separate data store depends on a flag 1635, permanent-hold status may be continued 1660.

According to some embodiments of the present disclosure, once the interaction uses up all the allowed extensions, e.g., three extensions, it is placed on a permanent-hold. This is a more secure form of hold, ensuring that the interaction is preserved indefinitely.

According to some embodiments of the present disclosure, depending on the system's configuration, once the interaction is placed under permanent hold, it may be moved to a separate data storage area 1640. This could be a more secure or isolated storage environment, specifically designated for long-term retention of critical data. The interaction may be released from hold, based on user preferences or system policies 1645. Once released, the interaction will follow its standard lifecycle, which could involve processes such as archiving or deletion according to organizational policies.

According to some embodiments of the present disclosure, the interaction is securely preserved but can be released later, allowing it to re-enter the normal data lifecycle, such as archiving or deletion.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for detection and implementation of litigation- hold and release for interactions recordings within a contact center, said computerized-method comprising:

for each recording file of an interaction between a customer and an agent in the contact center:

(i) retrieving interaction metadata and interaction analysis;

(ii) calculating a Litigation Likelihood Score (LLS) for a recording file of the interaction based on the retrieved interaction metadata and interaction analysis;

(iii) identifying the recording file as a candidate for litigation-hold status when the LLS is above a preconfigured threshold;

(iv) applying one or more exclusion rules to the recording file identified as the candidate for litigation-hold status;

(v) setting the recording file on litigation-hold status for a preconfigured period of time when the LLS is above a preconfigured threshold and the recording file is not excluded by the one or more exclusion rules based on metadata;

(vi) checking when the preconfigured period of time has elapsed, whether the recording file was accessed during the preconfigured period of time; and (vii) releasing the recording file from litigation-hold status when the preconfigured period of time has elapsed and the recording file was not accessed during the preconfigured period of time.

2. The computerized-method of claim 1, wherein said interaction metadata comprising at least one of: (i) interaction identifier; (ii) duration of interaction; (iii) participants involved in the interaction; (iv) communication channels; (v) sentiment; (vi) intent of interaction; and (vii) compliance terms, and wherein said interaction analysis comprising at least one of: (i) number of explicit terms mentioned; (ii) frequency of each emotion term; (iii) frequency of negative sentiment term; (iv) total number of terms in interaction; (v) one or more high value attribute; (vi) one or more intent indicators; (vii) one or more loss indicators; (viii) one or more compliance factors; (ix) frequency of credibility terms;

and (x) number of past litigations with similar context, wherein said one or more loss indicators comprising mention of one of: a. potential financial loss; b. safety concerns; c. health risks; and d. issues with essential services.

3. The computerized-method of claim 2, wherein said calculating of the LLS is according to formula I:

$$LLS = \sqrt[3]{ThreatScore\ (TS) \times LitigationSentiment\ (LS) \times LitigationImpactScore\ (LIS)} \tag{I}$$

whereby:

TS is calculated according to formula II:

$$TS = \text{w\_1} \times (\text{Explicitness score}) + \text{w\_2} \times (\text{Credibility Score}) + \text{w\_3} \times (\text{Compliance score}) + \text{w\_4} \times (\text{Historic Litigation Likelihood Score } (HLLS)), \tag{II}$$

whereby:

w_1-w_4 are preconfigured weights, $$\text{Explicitness Score} = (\text{number of explicit terms mentioned})/(\text{total number of terms}),$$

$$\text{Credibility Score} = \sum_{i=1}^{n} (\text{ frequency of credibility term(i)} \times \text{W(i)}),$$

whereby:

W(i) is a weight assigned to a credibility term (i), $$\text{Compliance Score} = \sum_{i=1}^{n} (\text{ compliance factors}(j) \times W(j)),$$

and

W(j) is a weight assigned to a compliance factor (j), $$HLLS = \text{total number of similar interactions/ number of past litigations with similar context},$$

LS is calculated according to formula III:

$$LS = \text{w\_5} \times (\text{emotional sentiment}) + \text{w\_6} \times (\text{negative sentiment}) \times \text{w\_7} \times (\text{perceived intent}) + \text{w\_8} \times (\text{risk aversion}), \tag{III}$$

whereby:

w_5-w_8 are preconfigured weights, $$\text{emotional sentiment} = \sum_{k=1}^{l} (\text{ frequency of emotional term}(k) \times W(k))$$

$$\text{negative sentiment} = \frac{\sum_{l=1}^{p} (\text{ frequency negative sentiment term}(l) \times W(l))}{\text{total number of terms in interaction}}$$

-continued $$\text{perceived intent} = \sum_{t=1}^{k} (\text{ Intent Indicator}(r) \times W(r)), \text{ and}$$

whereby:

number of past legal disputes is a number of disputes during the preconfigured period, total number of interactions is a number of interactions where customer was involved, LIS is calculated according to formula IV:

$$LIS = \text{w\_9} \times (\text{interaction value}) + \text{w\_10} \times (\text{potential loss probability}) + \text{w\_11} \times (\text{impact score}) + \text{w\_12} \times (\text{timeline of an issue related to the recording file of the interaction}), \quad \text{(IV)}$$

whereby:

w_9-w_12 are preconfigured weights, $$\text{Interaction Value} = \sum_{t=1}^{k} (\text{high value attribute}(t) \times W(t))$$

whereby:

high-value attribute (t) is a binary value, '1' if the attribute is present, '0' if not, Wt is the weight assigned to high-value attribute (t) based on its importance, and k is a number of different high-value attributes considered, $$\text{Potential Losss Probability} = \sum_{i=1}^{n} (\text{ loss indicator}(i) \times W(i))$$

$$\text{impact score} = \text{severity of impact} \times \text{probability of litigation}$$

whereby:

severity of impact is a weighted value based on a parameter of potential consequences of litigation, and probability of litigation is a parameter that is derived from other factors, $$\text{timeline of an issue related to the recording file of the interaction} = \log\ (\text{duration of the issue in days} + 1)$$

whereby:

duration of the issue in days is a period of time since the issue raised by the customer in the interaction.

4. The computerized-method of claim 1, wherein said litigation-hold status comprising at least one of: (i) prevention from deletion; (ii) prevention from editing; (iii) prevention from alteration; and (iv) exclusion from data lifecycle processes.

5. The computerized-method of claim 1, wherein said computerized-method further comprising extending the preconfigured period of time of the litigation-hold status that has been set, when the recording file accessed.

6. The computerized-method of claim 5, wherein said computerized-method further comprising setting the recording file on permanent-hold when a preconfigure number of consecutive extensions of the preconfigured period of time have been performed.

7. The computerized-method of claim 1, wherein the releasing of the recording file from litigation-hold status when the preconfigured period of time has elasped is performed when there is no litigation-hold status selection from a user via a Graphical User Interface (GUI).

8. A computerized-system for detection and implementation of litigation-hold and release for interactions recordings within a contact center, said computerized-system comprising:

an interactions database;

a recording files database;

one or more processors; and a memory to store the plurality of databases, for each recording file of an interaction between a customer and an agent in the contact center the one or more processors configured to:

(i) retrieve interaction metadata and interaction analysis from the interactions database;

(ii) calculate a Litigation Likelihood Score (LLS) for a recording file of the interaction based on the retrieved interaction metadata and interaction analysis;

(iii) identify the recording file as a candidate for litigation-hold status when the LLS is above a preconfigured threshold;

(iv) apply one or more exclusion rules to the recording file identified as the candidate for litigation-hold status;

(v) set the recording file in the recording files database on litigation-hold status for a preconfigured period of time when the LLS is above a preconfigured threshold and the recording file is not excluded by the one or more exclusion rules based on metadata;

(vi) check when the preconfigured period of time has elapsed whether the recording file was accessed during the preconfigured period of time; and (vii) release the recording file in the recording files database from litigation-hold status when the preconfigured period of time has elapsed and the recording file was not accessed during the preconfigured period of time.

* * * * *